United States Patent [19]

Miyazawa et al.

[11] Patent Number: 5,357,627
[45] Date of Patent: Oct. 18, 1994

[54] MICROCOMPUTER HAVING A PROGRAM CORRECTION FUNCTION

[75] Inventors: Azuma Miyazawa, Mitaka; Toshiaki Ishimaru, Hachioji, both of Japan

[73] Assignee: Olympus Optical Co., Ltd., Tokyo, Japan

[21] Appl. No.: 40,562

[22] Filed: Mar. 31, 1993

Related U.S. Application Data

[63] Continuation of Ser. No. 496,807, Mar. 21, 1990, abandoned.

[30] Foreign Application Priority Data

Mar. 28, 1989 [JP] Japan .................................. 1-76047
May 25, 1989 [JP] Japan ................................. 1-131861
Dec. 18, 1989 [JP] Japan ................................. 1-325876

[51] Int. Cl.$^5$ ............................................. G06F 11/00
[52] U.S. Cl. ................................. 395/575; 371/10.1; 371/10.2
[58] Field of Search ............... 395/575; 371/10.1, 10.2; 364/255, 259.2, 269.2, 285.1

[56] References Cited

U.S. PATENT DOCUMENTS

| | | | |
|---|---|---|---|
| 3,748,653 | 7/1973 | Debruyne et al. ................ | 371/10.1 |
| 4,400,798 | 8/1983 | Francis et al. .................... | 365/174 |
| 4,542,453 | 9/1985 | Patrick et al. ..................... | 395/275 |
| 4,737,814 | 4/1988 | Nakajima ........................... | 354/412 |
| 4,802,119 | 1/1989 | Heene et al. ...................... | 364/900 |
| 4,831,517 | 5/1989 | Crouse et al. .................... | 371/10.1 |
| 4,914,464 | 4/1990 | Azuma et al. ..................... | 354/400 |
| 4,928,281 | 5/1990 | Kurosawa et al. ................ | 371/51.1 |
| 5,051,897 | 9/1991 | Yamaguchi et al. .............. | 371/10.2 |
| 5,237,687 | 8/1993 | Okamoto ........................... | 395/700 |

FOREIGN PATENT DOCUMENTS

| | | | |
|---|---|---|---|
| 0034199 | 4/1981 | Japan ................................. | 371/10.2 |
| 0002942 | 1/1983 | Japan ................................. | 371/10.2 |
| 0002943 | 1/1983 | Japan ................................. | 371/10.2 |
| 0016349 | 1/1983 | Japan ................................. | 371/10.2 |
| 0016350 | 1/1983 | Japan ................................. | 371/10.2 |
| 59-183445 | 10/1984 | Japan . | |
| 60-258654 | 12/1985 | Japan . | |
| 62-52635 | 3/1987 | Japan . | |
| 62-248043 | 10/1987 | Japan . | |
| 63-8937 | 1/1988 | Japan . | |
| 63-156231 | 6/1988 | Japan . | |

Primary Examiner—Robert W. Beausoliel, Jr.
Assistant Examiner—Glenn Snyder
Attorney, Agent, or Firm—Frishauf, Holtz, Goodman & Woodward

[57] ABSTRACT

A microcomputer includes a program memory for storing program data, a program counter for addressing the program memory, an instruction decoder for decoding the program data read out from an address of the program memory addressed by the program counter, an electrically programmable nonvolatile memory for storing address data denoting an address of the program memory where program data to be corrected is stored, and correction program data, a comparator for comparing the output from the program counter with the address data stored in the nonvolatile memory and outputting a coincidence signal when a coincidence is found therebetween, and a program correction circuit for reading out the program data from the nonvolatile memory in response to the coincidence signal, and for supplying the readout data to the instruction decoder in place of the output from the program memory.

According to another feature, the microcomputer may comprise a program correction circuit wherein a correction address is supplied to a program counter, and wherein code sections are stored.

26 Claims, 19 Drawing Sheets

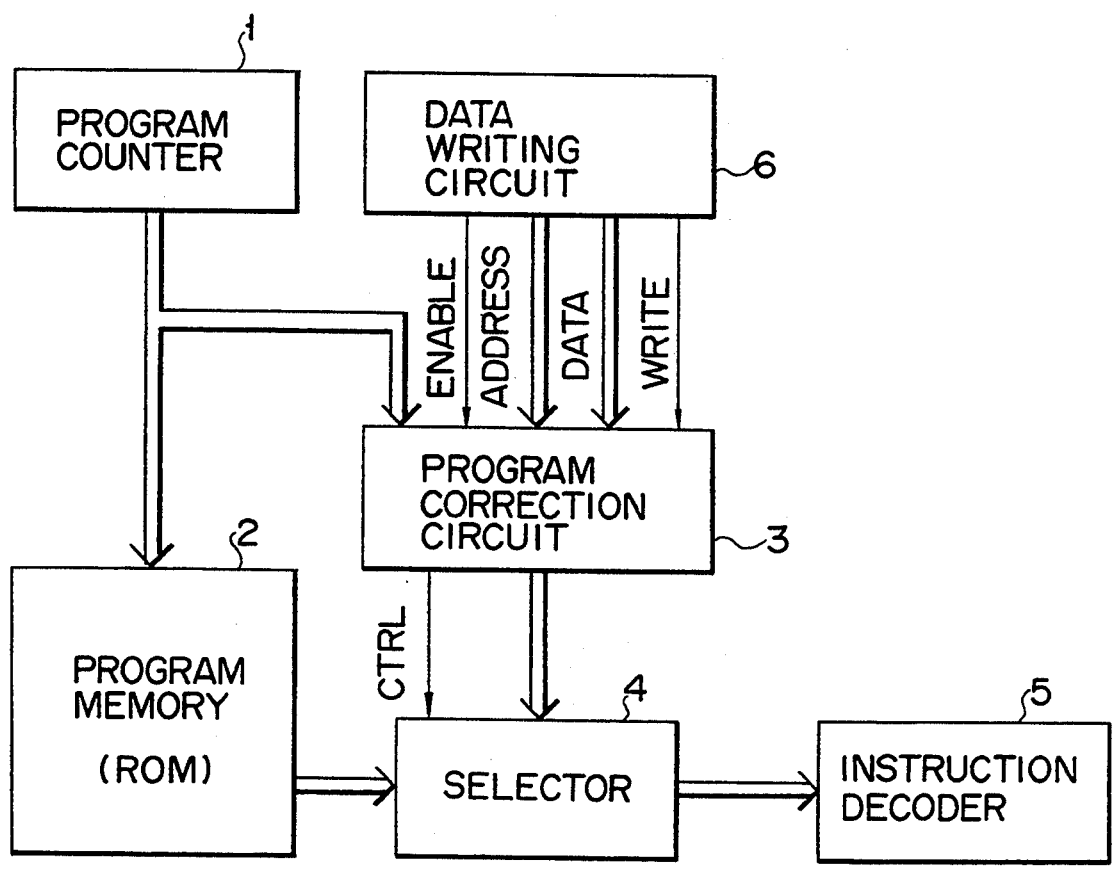
F I G. 2

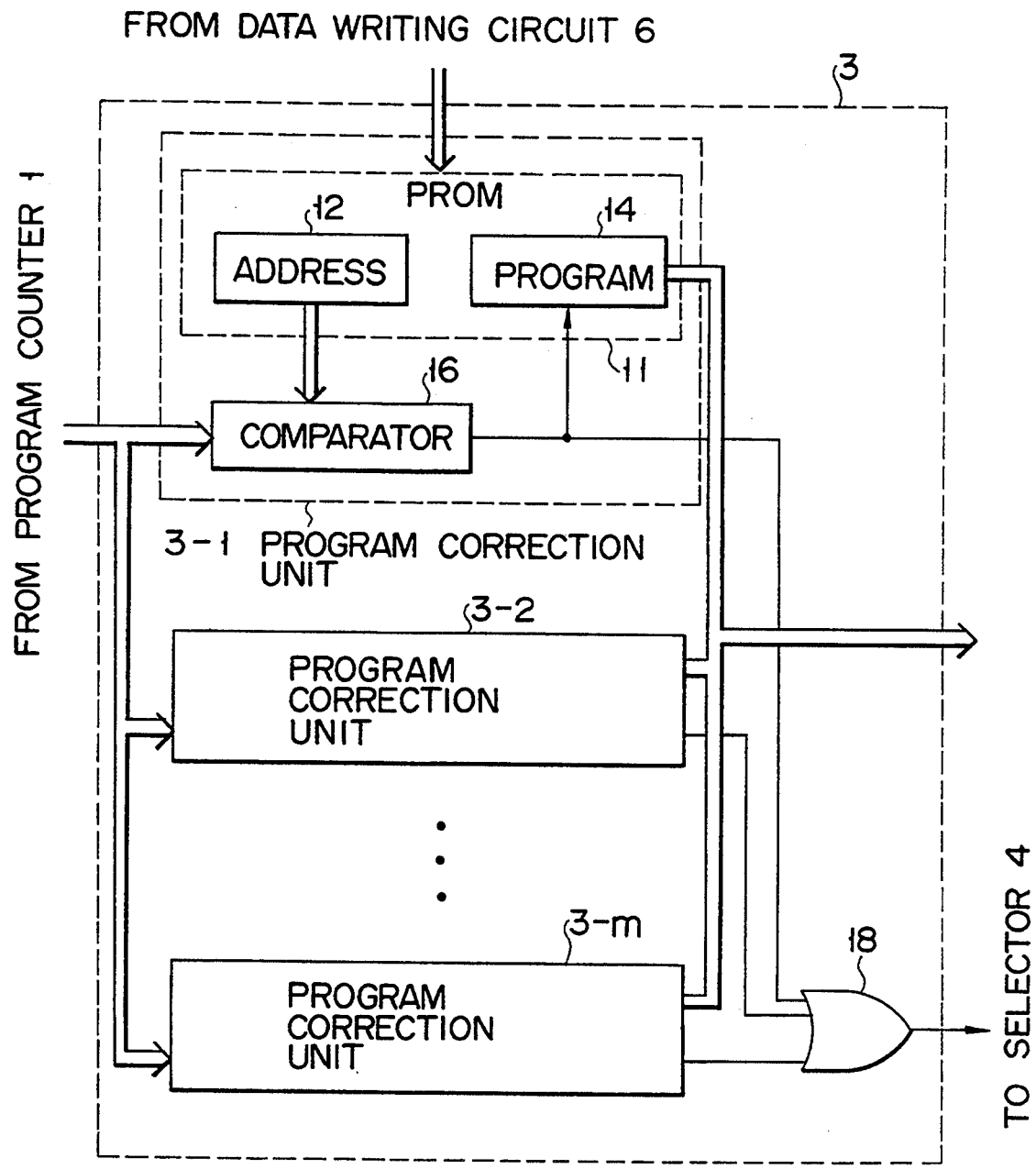
F I G. 3

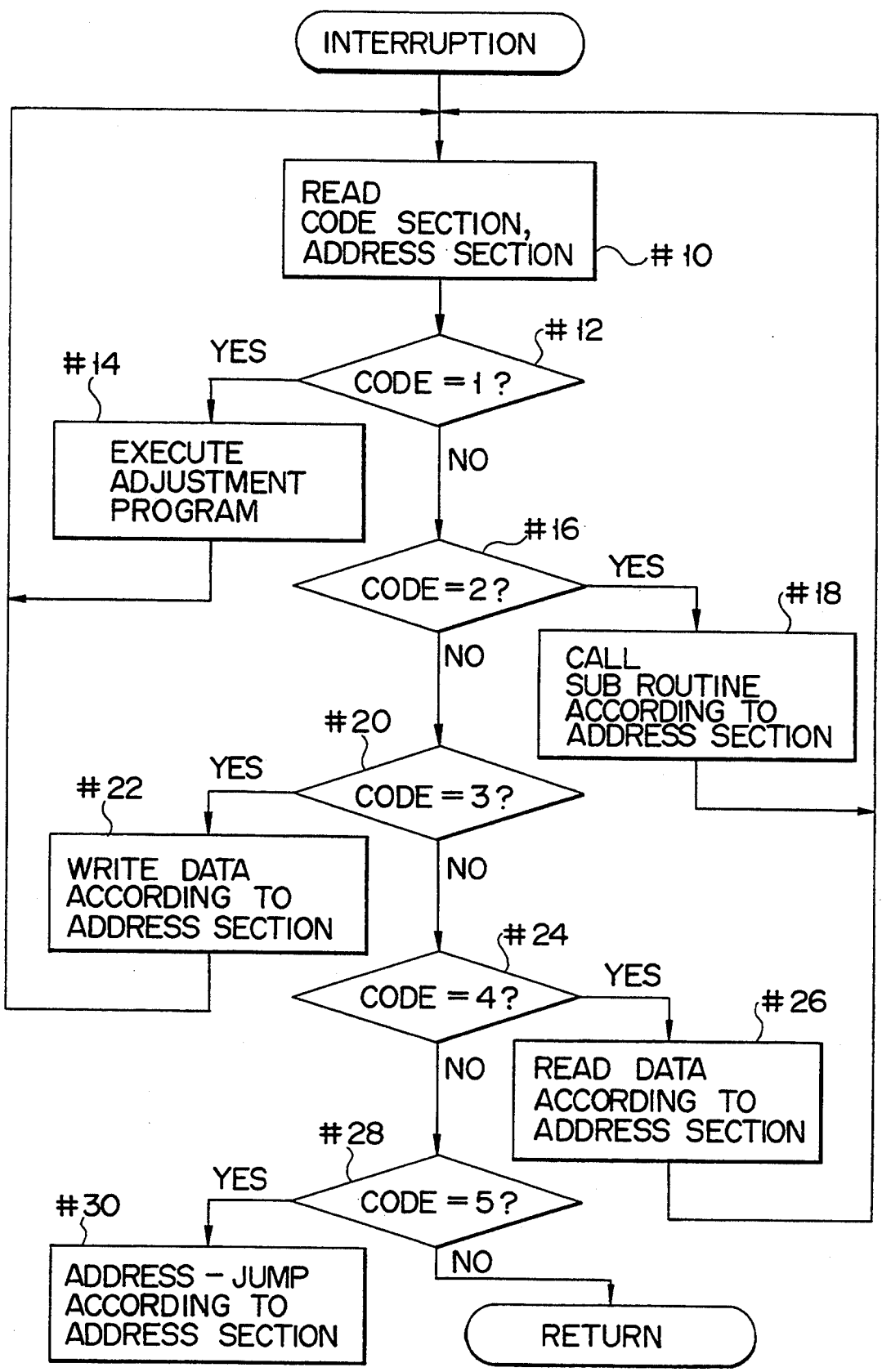
F I G. 8

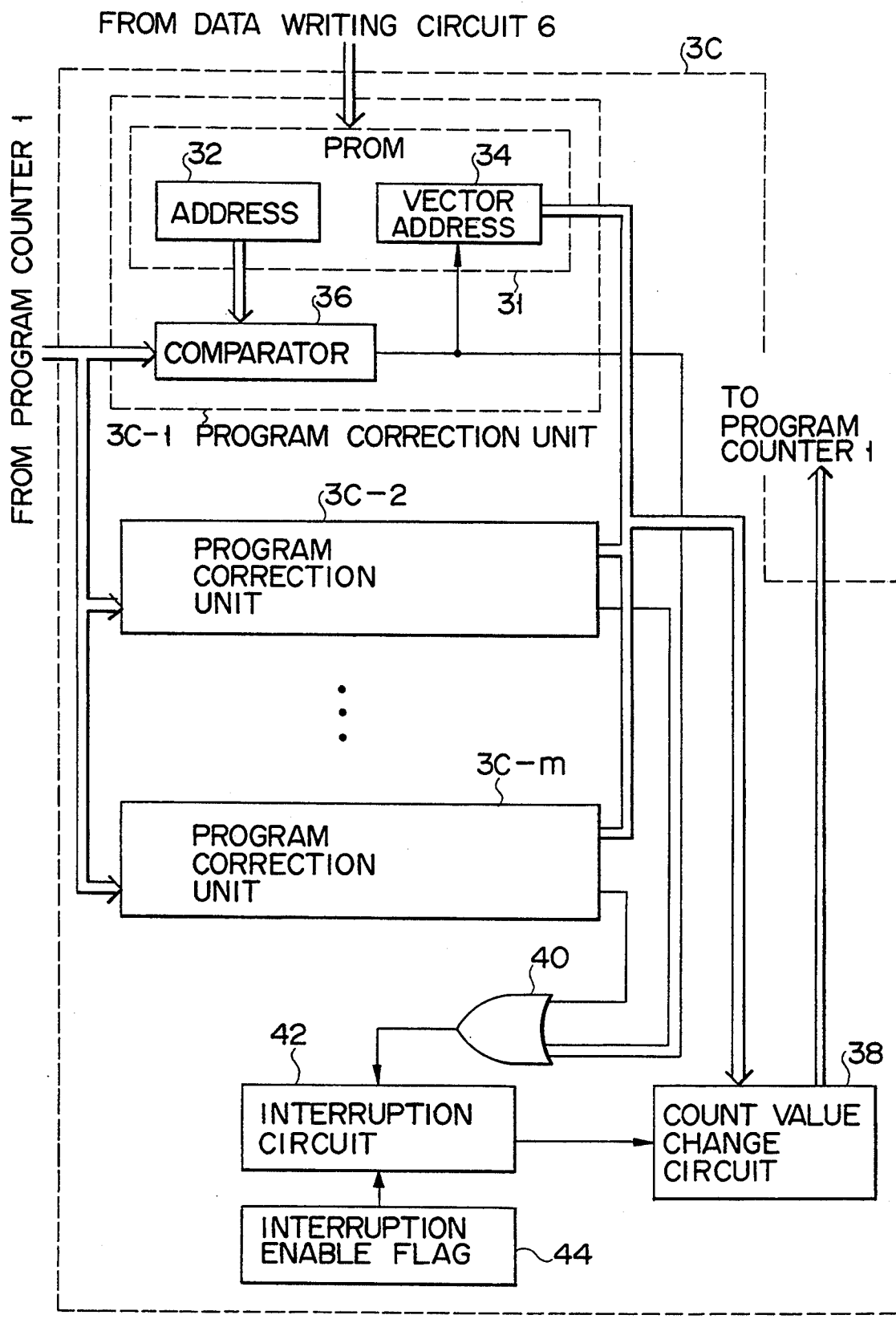
F I G. 12

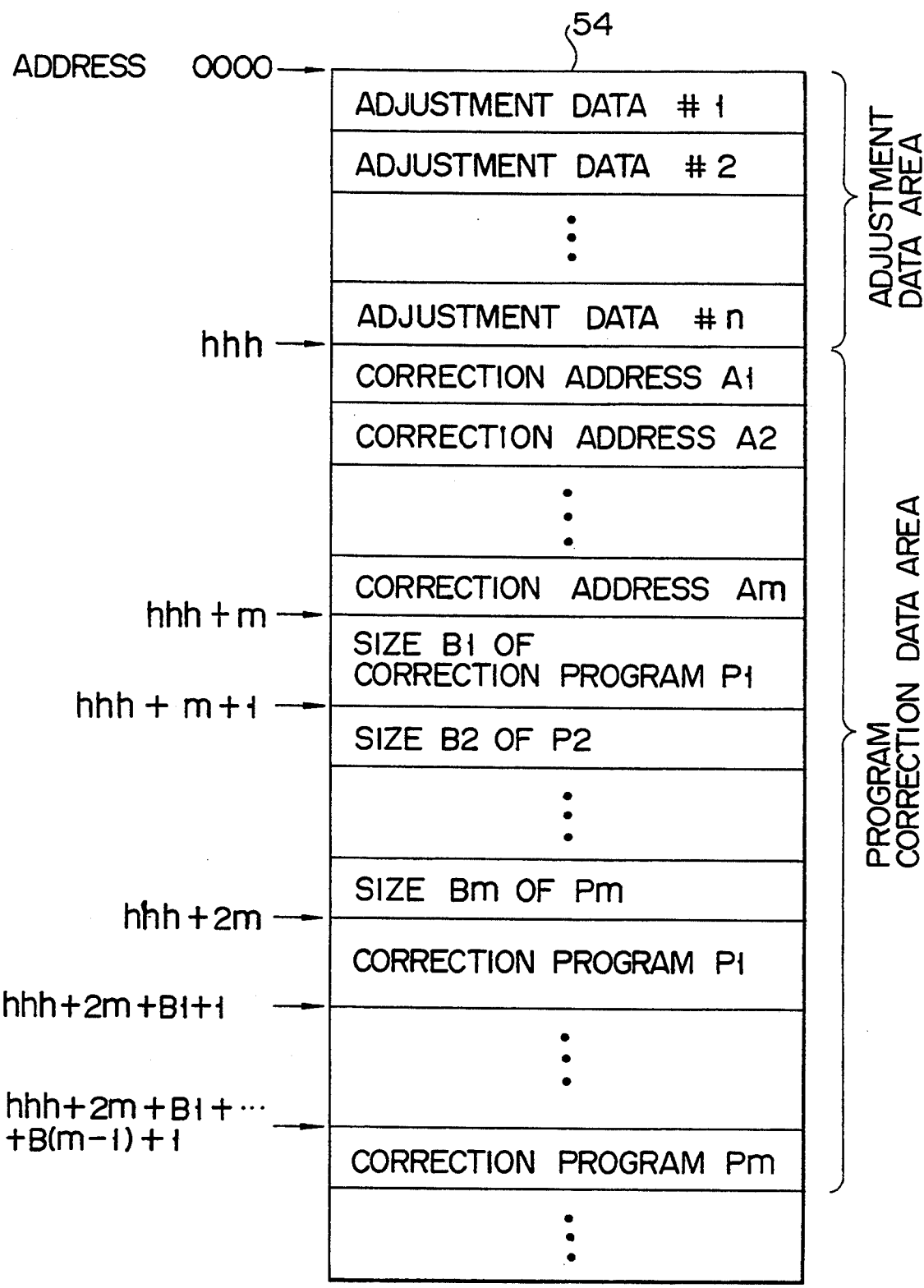
F I G. 17

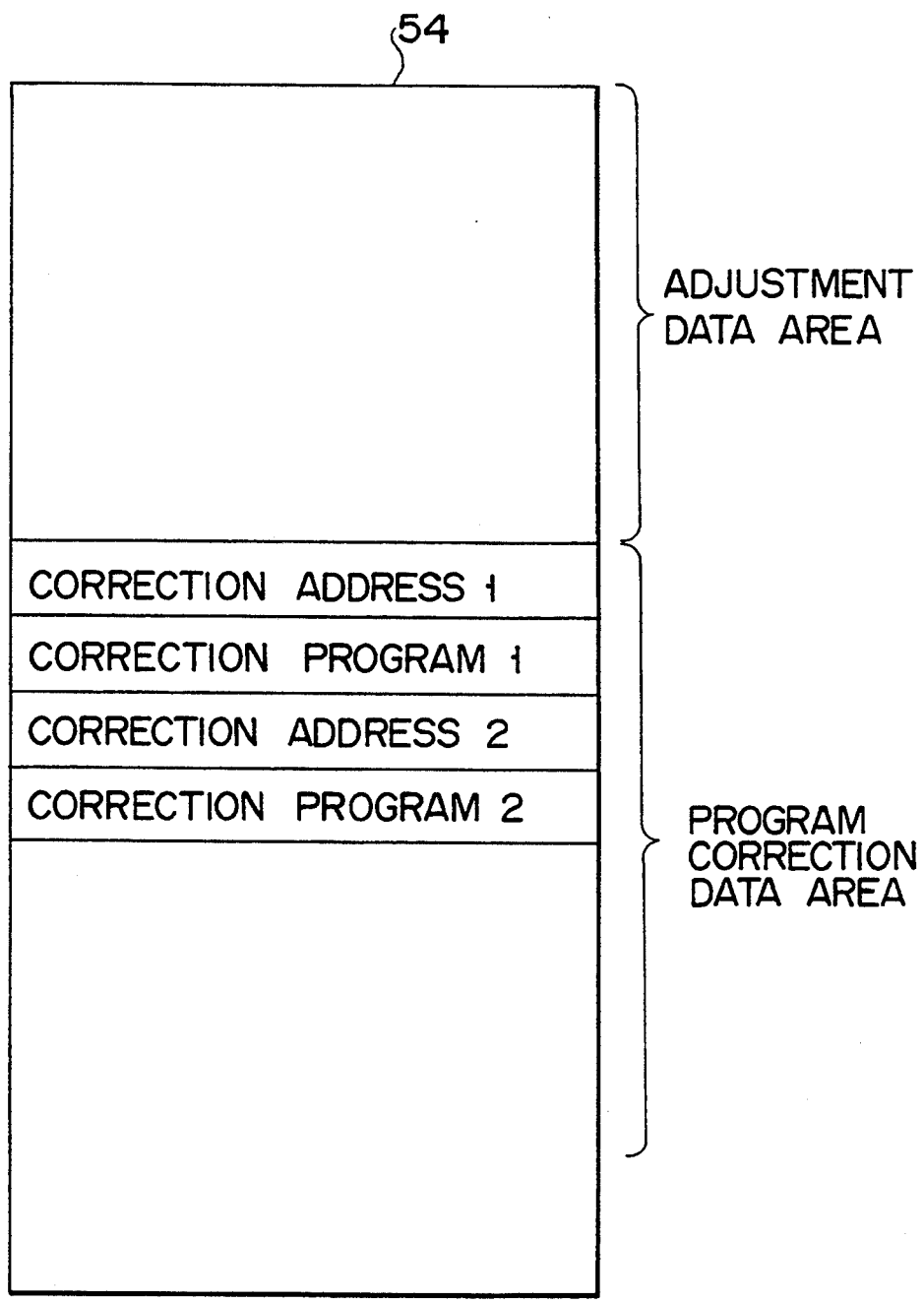
F I G. 19

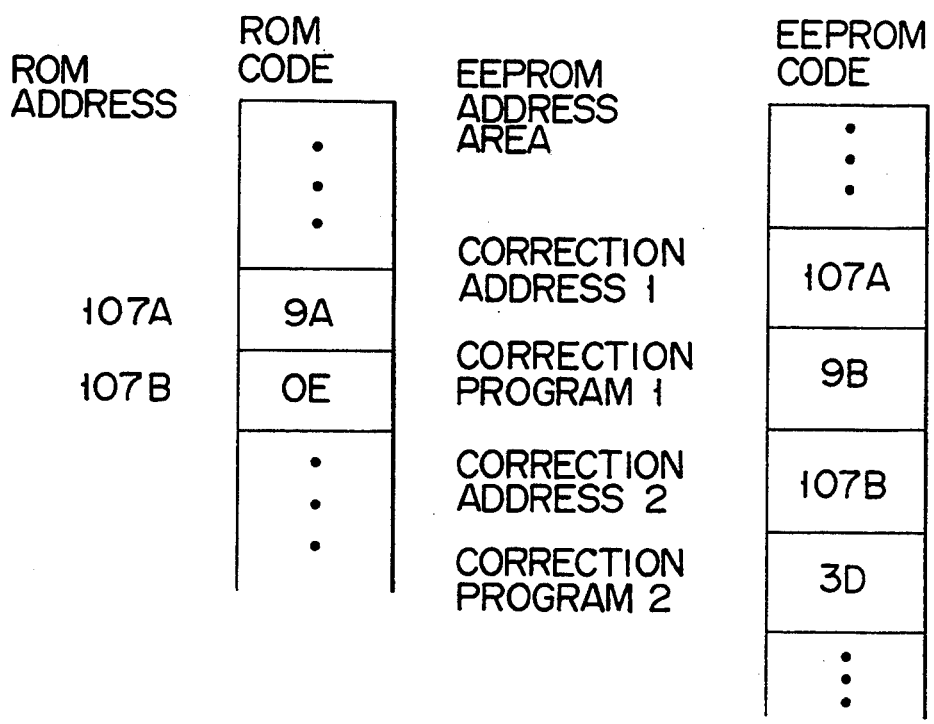
F I G. 20
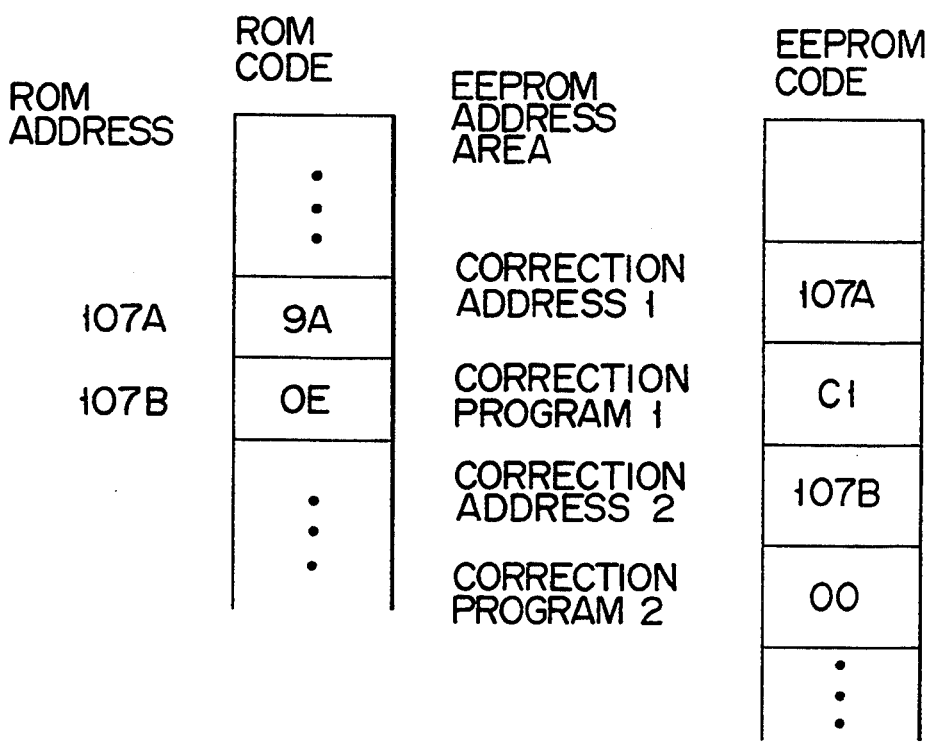
F I G. 21

| ROM ADDRESS | ROM CODE |
|---|---|
| ⋮ | ⋮ |
| 3A02 | C1 |
| 3A03 | 9A |
| 3A04 | 0E |
| 3A05 |  |
| ⋮ | ⋮ |
| C000 |  |
| C001 |  |
| C002 |  |
| C003 |  | 
| C004 |  |
| C005 |  |
| C006 |  |
| C007 |  |
| ⋮ | ⋮ |

(C000–C007 bracketed as NOT USED)

| EEPROM ADDRESS AREA | EEPROM CODE |
|---|---|
| ⋮ | ⋮ |
| ADDRESS 1 | 3A02 |
| PROGRAM 1 | 90 |
| ADDRESS 2 | 3A03 |
| PROGRAM 2 | C0 |
| ADDRESS 3 | 3A04 |
| PROGRAM 3 | 00 |
| ADDRESS 4 | C000 |
| PROGRAM 4 | 79 |
| ADDRESS 5 | C001 |
| PROGRAM 5 | 46 |
| ADDRESS 6 | C002 |
| PROGRAM 6 | B3 |
| ADDRESS 7 | C003 |
| PROGRAM 7 | 9A |
| ADDRESS 8 | C004 |
| PROGRAM 8 | 0E |
| ADDRESS 9 | C005 |
| PROGRAM 9 | 90 |
| ADDRESS 10 | C006 |
| PROGRAM 10 | 3A |
| ADDRESS 11 | C007 |
| PROGRAM 11 | 05 |
| ⋮ | ⋮ |

F I G. 22

MICROCOMPUTER HAVING A PROGRAM CORRECTION FUNCTION

This application is a continuation of U.S. patent application Ser. No. 07/496,807, filed Mar. 21, 1990, now abandoned.

BACKGROUND OF THE INVENTION

1. Field of the Invention

The present invention relates to a microcomputer and, more particularly, to a microcomputer for substantially changing a program stored in a read-only memory (ROM).

2. Description of the Related Art

In general, a conventional one-chip microcomputer comprises a program counter, a program memory for storing a predetermined program, and an instruction decoder. As is well known, an operation of the one-chip microcomputer is executed as follows. That is, program data read out from the program memory which is addressed by the program counter which is incremented in response to system clocks (not shown) is decoded by the instruction decoder, thereby executing a program.

The program memory normally comprises a mask ROM (Read-Only Memory). A program is written in the mask ROM during a manufacturing process by a manufacturer, and cannot be rewritten by a user. However, when a bug is found in the program written in the mask ROM or the program is to be partially corrected after the manufacture of the one-chip microcomputer, the mask pattern of the ROM must be rewritten, and the manufacturing process of the microcomputer must be restarted. Therefore, several months are required until a corrected one-chip microcomputer is available. In addition, the one-chip microcomputer in which a bug is found in the program written in the mask ROM cannot be reused.

Recently, so-called one-time ROMs which can be rewritten once by a user are commercially available. However, the one-time ROM is very expensive as compared to the mask ROM, and considerable time and labor are required for a user to write a program. Thus, the one-time ROM is not suitable for mass-production products.

SUMMARY OF THE INVENTION

It is an object of the present invention to provide a microcomputer which partially rewrites a program without rewriting the entire contents of a program memory when a bug is found in the program written in the program memory or the program is to be partially corrected, or which executes interruption processing to substantially add or delete a program data.

A microcomputer according to the present invention comprises a program counter, a program memory, an instruction decoder, and a programmable nonvolatile memory. The nonvolatile memory stores an address of the program memory storing a program data to be corrected, and a correction program. When an address indicated by the program counter coincides with the address stored in the nonvolatile memory, correction of the program is executed.

According to the microcomputer of the present invention, in order to correct a bug found in a program written in the program memory or partially correct the program, an address of the program memory storing a program data to be corrected, and a corrected program data are stored in the nonvolatile memory. When the address stored in the nonvolatile memory coincides with the address indicated by the program counter, the corrected program data is read out from the nonvolatile memory and is supplied to the instruction decoder in place of the program data read out from the program memory and to be corrected, and a corrected program is consequently executed.

According to the microcomputer of the present invention, in order to correct a bug found in a program written in the program memory or the program itself, an address of the program memory storing a program data to be corrected, and an interruption program for correcting the program are stored in the nonvolatile memory. When the address stored in the nonvolatile memory coincides with the address indicated by the program counter, an interruption processing is executed on the basis of the interruption program read out from the nonvolatile processing so far is changed by rewriting data in the memory, or calling a subroutine of a function to be added, or unconditionally jumping the address of the program counter, thereby substantially adding or deleting the program data. As a result, the program can be corrected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the first embodiment of a microcomputer according to the present invention;

FIG. 3 is a block diagram showing an arrangement of a program correction circuit of the first embodiment;

FIG. 8 is a flow chart showing interruption processing of the third embodiment;

FIG. 12 is a block diagram of a program correction circuit of the fourth embodiment;

FIG. 17 shows a data format of an EEPROM of the sixth embodiment;

FIG. 19 shows a data format of an EEPROM in the seventh embodiment of a microcomputer according to the present invention;

FIG. 20 is a view for explaining an operation for changing an instruction code with another instruction code having the same length according to the seventh embodiment;

FIG. 21 is a view for explaining an operation for changing an instruction code with another instruction code having a smaller length according to the seventh embodiment; and FIG. 22 is a view for explaining an operation for changing an instruction code to another instruction code having a larger length according to the seventh embodiment.

DETAILED DESCRIPTION OF THE PREFERRED EMBODIMENTS

Figure 1:
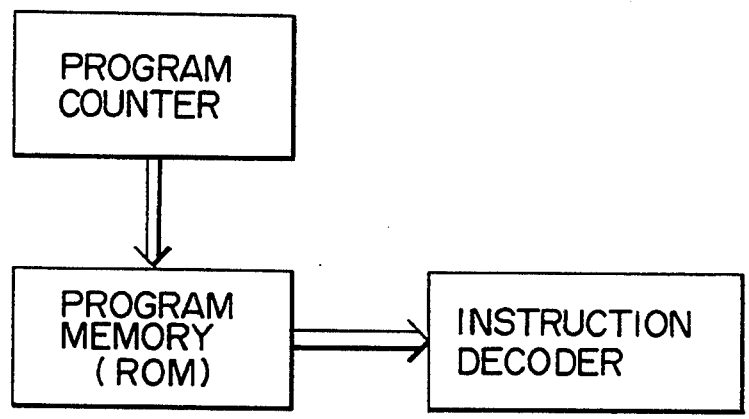
FIG. 1 is a block diagram showing a conventional microcomputer.

Embodiments of a microcomputer according to the present invention will be described below with reference to the accompanying drawings. FIG. 2 is a block diagram of a one-chip microcomputer according to the first embodiment of the present invention. The microcomputer comprises a program counter 1, a program memory 2 comprising, e.g., a mask ROM for storing predetermined program data, a program correction circuit 3 having an electrically programmable nonvolatile memory (e.g., including an EPROM or EEPROM, and additionally including a conventional RAM in a system whose battery is backed up, to be referred to as a PROM hereinafter), a selector 4, an instruction decoder 5, and a data writing circuit 6.

The program counter 1 is connected not only to the program memory 2 but also to the program Correction circuit 3, and supplies address data to these circuits 2 and 3. The PROM of the program correction circuit 3 stores address data indicating an address of the program memory 2 which stores program data to be corrected, and corrected program data in order to cope with a case program memory 2 or the program is to be partially corrected. When the output from the program counter 1 coincides with the address stored in the PROM, the program correction circuit 3 outputs the corrected program data for correcting the program data stored in that address to the selector 4, and also outputs a control signal indicating a coincidence of the address to the selector 4.

The selector 4 normally selects output data from the program memory 2 and supplies the selected data to the instruction decoder 5. When the control signal is generated by the program correction circuit 3, the selector 4 selects the program data (corrected program data) output from the program correction circuit 3 in place of the output data (program data to be corrected) output from the program memory 2, and supplies the selected data to the instruction decoder 5. The selector 4 comprises a multiplexer. The data writing circuit 6 serves as a write control unit for controlling write access of the program correction circuit 3, and writes the address data indicating the address which stores the program data to be corrected, and the corrected program data in the PROM.

The operation of the microcomputer according to the first embodiment will be described below. The operation of this microcomputer is basically the same as that of the conventional microcomputer, except that a program written in the program memory 2 is partially rewritten and the program is substantially corrected. More specifically, in a normal operation, data read out from the program memory 2 addressed by the program counter 1 which is incremented by system clocks (not shown) is selected by the selector 4, and is decoded by the instruction decoder 5, thereby executing a program stored in the program memory 2. However, when the address data stored in the PROM of the program correction circuit 3 coincides with the output of the program counter 1, the program correction circuit 3 outputs the control signal and the corrected program data, and the selector 4 is switched in response to the control signal, so that the output data (corrected program data) from the program correction circuit 3 is input to the instruction decoder 5 in place of the output data (program data to be corrected) from the program memory 2. Thus, the substantially rewritten program data is decoded by the instruction decoder 5, and the corrected program can be executed.

The operation of the data writing circuit 6 will be described below, when a bug is found in a program written in the program memory 2 or when the program is to be partially corrected, a write enable signal is supplied from the data writing circuit 6 to the program correction circuit 3, thus enabling data write access of the program correction circuit 3. When data writing circuit 6 designates an address of the PROM of the program correction circuit 3, supplies data to the program correction circuit 3, and enables a write signal, data is written in the PROM of the program correction circuit 3. This data includes the address data and corrected program data, as described above. The address data and the corrected program data may be simultaneously written at the same address of the PROM or may be written at different addresses.

FIG. 3 shows a detailed arrangement of the program correction circuit 3 of the first embodiment. The program correction circuit 3 has a plurality of program correction units 3-1 to 3-m arranged in correspondence with the number of addresses of the program memory 2 which store program data to be corrected. Each of the units 3-1 to 3-m comprises a PROM 11 having an address data area 12 and a corrected program data area 14, and a comparator 16. Address data indicating an address of the program memory 2 which stores program data to be corrected is written, and corresponding corrected program data are respectively written in the address data area 12 and the corrected program data area 14 by the data writing circuit 6. The comparator 16 compares an address input from the program counter 1 with the address data stored in the address data area 12. When a coincidence is detected between these two address data, the comparator 16 enables a coincidence signal to cause the corrected program data area 14 to output the stored program data (corrected program data). Since the units 3-1 to 3-m are in charge of different program data (addresses) to be corrected, one of the units outputs corrected program data and the enabled coincidence signal when a program is to be corrected.

Output data (corrected program data) from one of the units 3-1 to 3-m becomes a data input to the selector 4 through a common bus, and the enabled coincidence signal output from one of the units 3-1 to 3-m is input to an OR gate 18. The output from the OR gate 18 is supplied to the selector 4 as the control signal, and causes the selector 4 to select the corrected program output data from the program correction circuit 3 in place of the program data to be corrected and output from the program memory 2.

Since the program correction circuit 3 can store any address of the program memory 2, program data stored at any address of the program memory 2 can be corrected. Note that a program usually includes several portions to be corrected, and several program correction units need only be arranged. Thus, the PROM 11 for correction can have a small capacity, and the cost of the one-chip microcomputer caused by adding the PROM 11 is increased slightly.

As described above, according to the present invention, when a bug is found in a program written in the program memory 2 or the program is to be partially corrected, an address of the program memory 2 which stores program data to be corrected, and corrected program data are stored in the PROM 11 of the program correction circuit 3. Thus, when the address stored in the program correction circuit 3 coincides with the address indicated by the program counter 1, corrected program data read out from the program correction circuit 3 is supplied to the instruction decoder 5 in place of program data read out from the program memory 2, and a debugged program can be consequently executed. Therefore, a microcomputer in which a bug is found can be used by writing the corrected program data into the PROM, a program memory need not be reformed, and the manufacturing process can be prevented from being complicated. As a result, a corrected microcomputer can be obtained within a short period of time. When debugging is performed in practice, one or two program data need only be corrected, and the microcomputer of the present invention is very advantageous.

Figure 4:
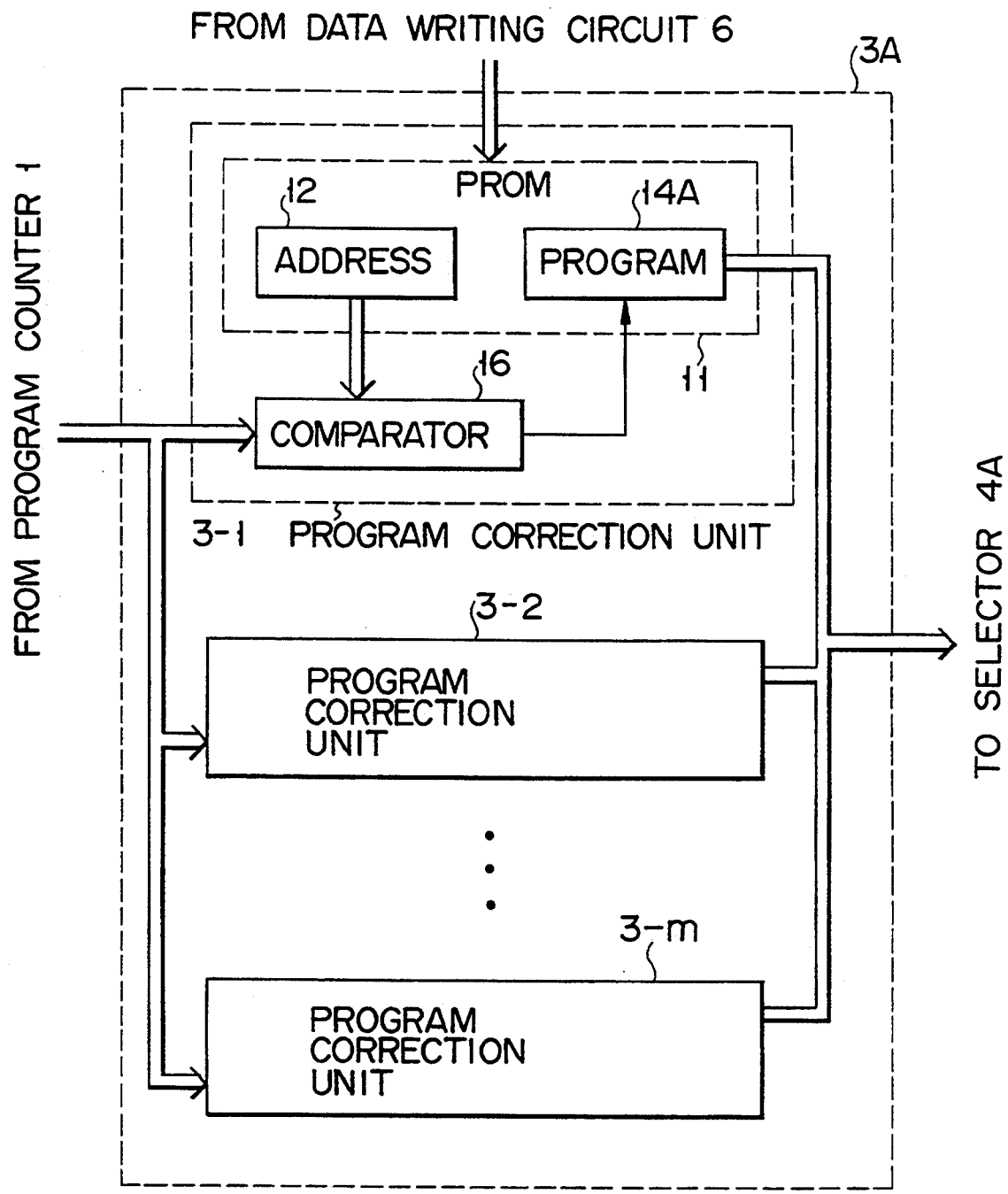
FIG. 4 is a block diagram showing an arrangement of a program correction circuit according to the second embodiment of a microcomputer of the present invention.
Figure 5:
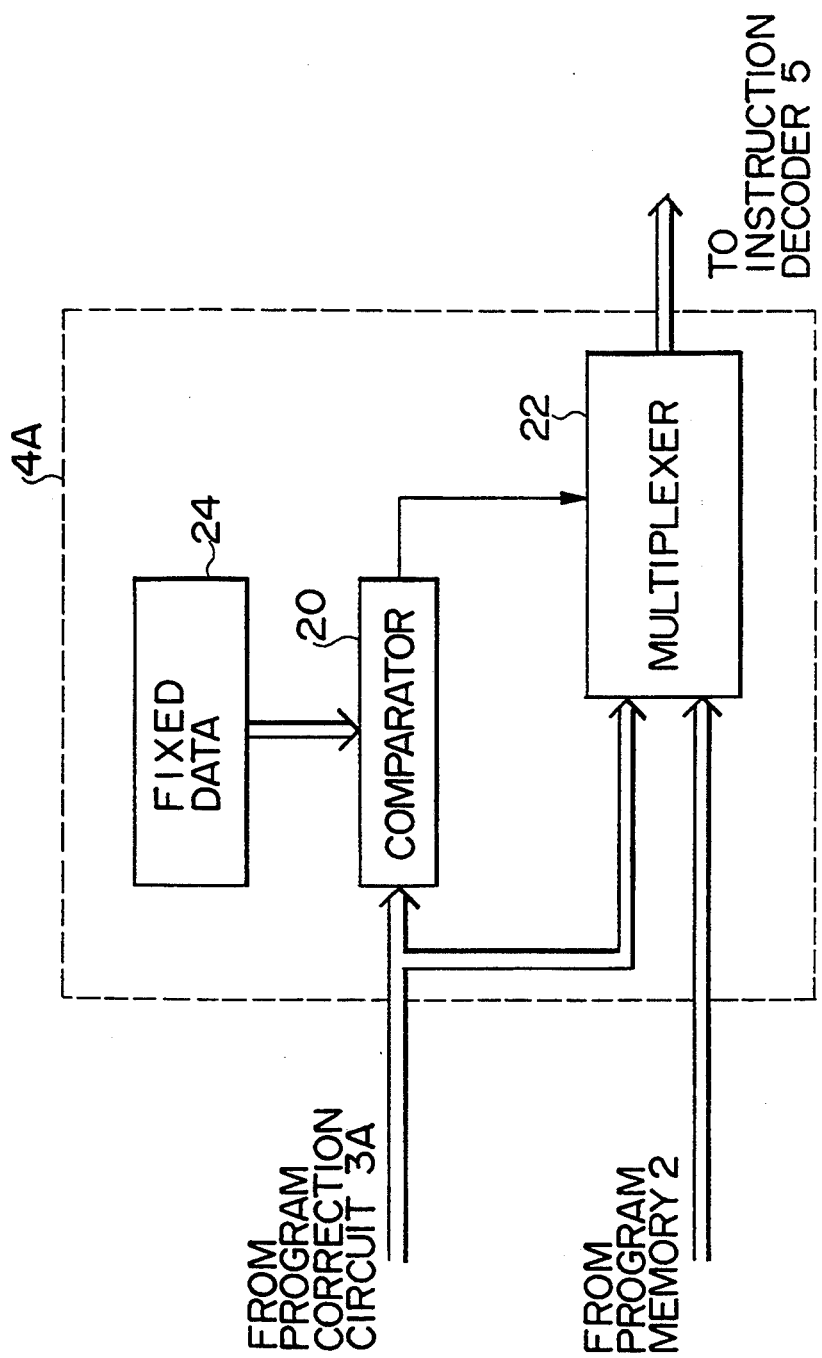
FIG. 5 is a block diagram showing an arrangement of a selector of the second embodiment.

Another embodiment of the present invention will be described hereinafter. Note that the same reference numerals in the following description denote the same parts as in the first embodiment, and a detailed description thereof will be omitted. The overall arrangement of the second embodiment is the same as that of the first embodiment, and is omitted. FIGS. 4 and 5 are block diagrams of a program correction circuit 3A and a selector 4A according to the second embodiment. In the program correction circuit 3A, as shown in FIG. 4, the OR gate 18 is omitted from the arrangement of the first embodiment shown in FIG. 3 so as not to output the control signal. A corrected program data area 14A outputs corrected program data when a coincidence is detected as a result of address comparison by the comparator 16. When a noncoincidence is detected between two addresses (when program data need not be corrected), the corrected program data area 14A outputs predetermined program data (e.g., NOP code).

The selector 4A is arranged, as shown in FIG. 5, and performs data selection without receiving the control signal. More specifically, program data from the program correction circuit 3A is input to a comparator 20 and a multiplexer 22, and program data from the program memory 2 is input to the multiplexer 22. The comparator 20 compares input data with the predetermined program data 24 which is output from the program correction circuit 3A when addresses do not coincide with each other. When a noncoincidence is detected between the two data by the comparator 20 (when program data must be corrected), the comparator 20 disables a switching control signal for the multiplexer 22; otherwise (when program data need not be corrected), it enables the switching control signal.

When the switching control signal input is disabled (when program data must be corrected), the multiplexer 22 selects and outputs corrected program data from the program correction circuit 3A in place of output data (program data to be corrected) from the program memory 2. When the switching control signal input is enabled (when program data need not be corrected), the multiplexer 22 selects and outputs output data (program data which need not be corrected) from the program memory 2.

According to the second embodiment, the contents of the program memory 2 can be rewritten in the same manner as in the first embodiment.

Figure 6:
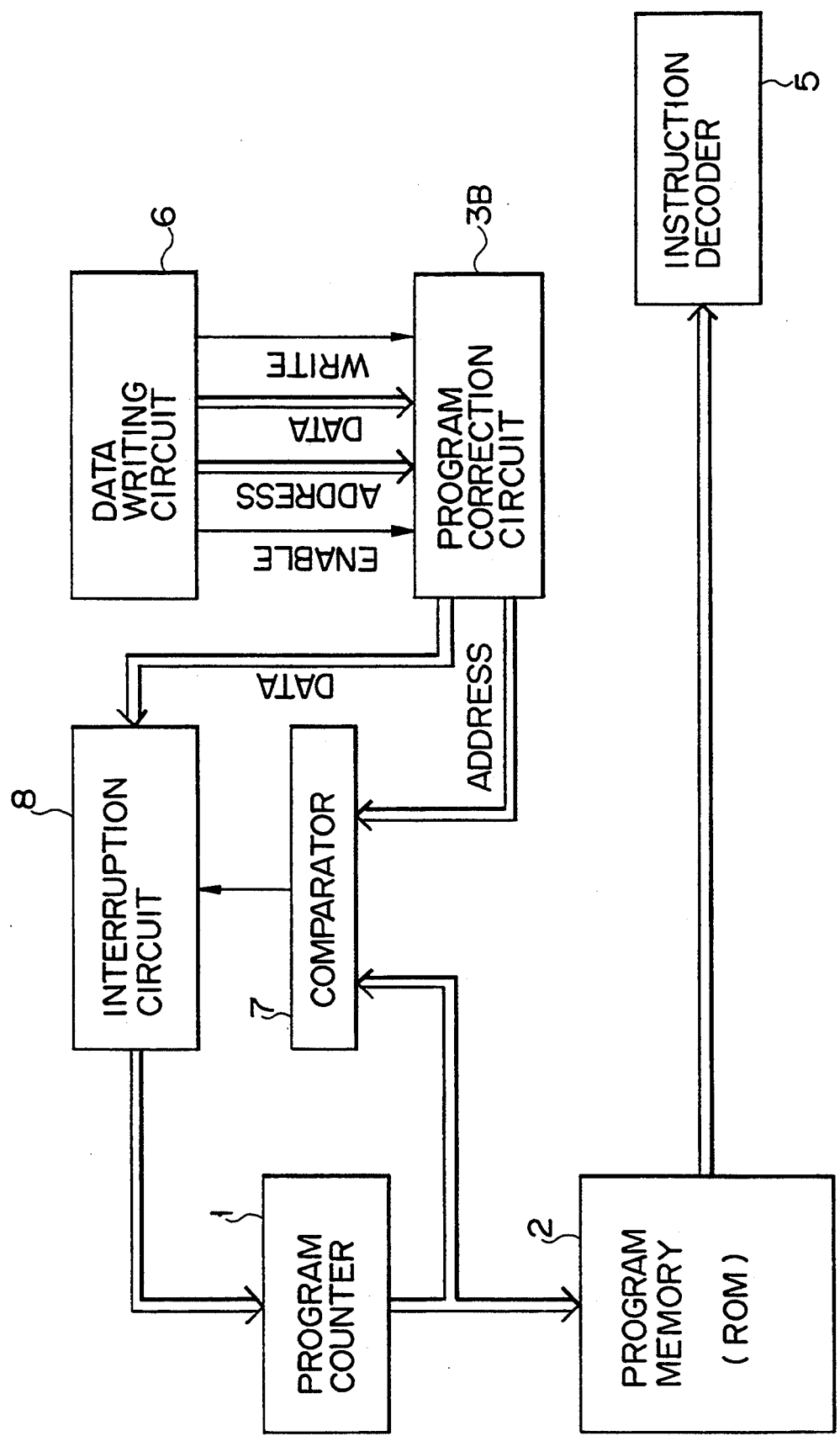
FIG. 6 is a block diagram showing the third embodiment of a microcomputer according to the present invention.

FIG. 6 shows the third embodiment. In the first and second embodiments, program data in the program memory 2 is replaced with program data in the PROM in the program correction circuit 3 or 3A to change a program. In the third embodiment, however, interruption processing is executed to execute a corrected program. Differences from the above embodiments are that (1) in order to correct a bug found in a program written in a program memory 2 or partially correct the program, address data indicating an address of the program memory 2 which stores program data to be corrected and program data of interruption processing for correcting a program are written in a PROM of a program correction circuit 3B; (2) an output (address value) from a program counter 1 and the address data stored in the program correction circuit 3B are supplied to a comparator 7, when a coincidence is detected between two inputs, interruption processing program data stored in the program correction circuit 3B which is corresponding to the input address data is loaded to an interruption circuit 8, and the contents of the program counter 1 are rewritten by the interruption circuit 8; and (3) the selector 4 or 4A is omitted, and the program data read out from the program memory 2 is input to the instruction decoder 5 without going through a selector. Note that program correction circuit 3B is connected to a system bus (not shown) of the microcomputer.

The operation of the third embodiment will be described below. The operation of this microcomputer is basically the same as that of the conventional microcomputer, except that interruption processing is generated during an arbitrary execution step of the program, and a program can be corrected by the interruption processing. The operation of the data writing circuit 6 will be described below. When a bug is found in a program written in the program memory 2 or the program is to be partially corrected, the data writing circuit 6 supplies a write enable signal to the program correction circuit 3B, thus enabling data writing access of the program correction circuit 3B. Furthermore, when the data writing circuit 6 designates an address of the PROM of the program correction circuit 3B, supplies data thereto, and enables a write signal, data is written in the PROM of the program correction circuit 3B. In this case, the written data includes address data of the program memory 2 which stores program data to be corrected, and interruption program data for correcting the program data to be corrected, as described above. The address data and the interruption program data may be simultaneously written at the same address of the PROM or may be written at different addresses of the PROM.

In a normal operation mode, program data read out from the program memory 2 addressed by the program counter 1 which is incremented in response to system clocks (not shown) is decoded by the instruction decoder 5, thereby executing the program stored in the program memory 2. However, when the address data stored in the program correction circuit 3B coincides with the output contents of the program counter 1, an interruption occurs, the contents of the program counter 1 is changed, and interruption processing is executed. In this case, various processing operations (rewriting of data in the memory, calling of a subroutine of a function to be added, an unconditional jump, and the like) are executed on the basis of the interruption program data for correcting the program which is output from the program correction circuit 3B, thereby changing the flow of processing so far.

According to the third embodiment, a program can be substantially corrected, i.e., deleted or added upon interruption processing. Furthermore, the microcomputers of the first and second embodiments execute rewriting the program in units of the program steps stored at respective addresses of the program memory 2. Therefore, the number of steps of a program to be corrected must coincide with the number of steps of a corrected program. However, in the third embodiment, since the program data is not rewritten, the numbers of steps before and after program correction need not coincide with each other, and thus the program can be deleted or added, and another program can be executed.

Figure 7:
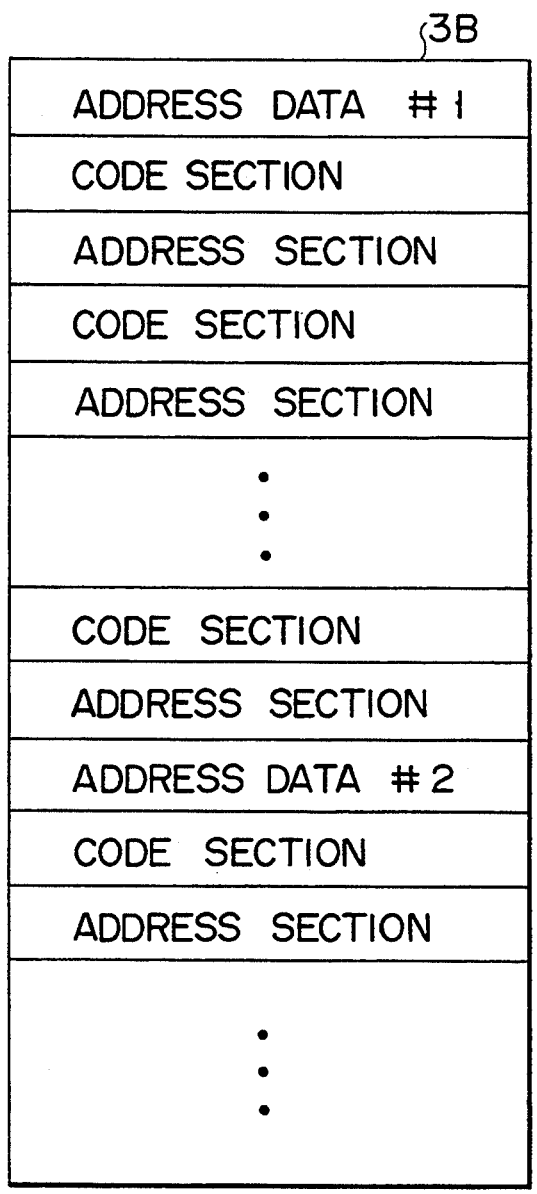
FIG. 7 shows a format of a PROM of a program correction circuit of the third embodiment.

The data format of the PROM of the program correction circuit 3B and the flow of the interruption processing will be described below with reference to FIGS. 7 and 8. As shown in FIG. 7, the data format of the PROM of the program correction circuit 3B comprises address data #i (i=1 to m) indicating respective addresses of the program memory 2 at which an interruption processing is to be started, and a plurality of pairs of code and address sections following the address data #i. When the contents of the program counter 1 coincide with address data #i, interruption processing is started. The program memory 2 is programmed such that a program shown in FIG. 8 is started upon interruption.

As shown in FIG. 8, in step #10, the first code and address sections following the address data #i are read out. It is determined in step #12 whether or not the contents of the code section are 1. If YES in step #12, an adjustment program is executed in step #14. If NO in step #12, it is determined in step #16 whether or not the contents of the code section are 2. If YES in step #16, a subroutine stored at an address indicated by the address section (this address may be an address of the program memory 2 or may be an address of the PROM of the program correction circuit 3B) is called. If NO in step #16, it is determined in step #20 whether or not the contents of the code section are 3. If YES in step #20, data in a data section is written at the address of the PROM Of the program correction circuit 3B indicated by the address section in step #22. If NO in step #20, it is determined in step #24 whether or not the contents of the code section are 4. If YES in step #24, data at the address of the program memory 2 or the PROM indicated by the address section is read out in step #26. If NO in step #24, it is determined in step #28 whether or not the contents of the code section are 5. If YES in step #28, the contents of the program counter is caused to jump to the address indicated by the address section in step #30. If NO in step #28, the flow returns to the original routine. The return from the interruption processing can be easily realized by rewriting the contents of the program counter 1 with a return address saved in a stack (not shown).

Of course, data of the program correction circuit 3B may be executed in place of a normal instruction code. In general, however, ordinary debugging can often be achieved by adding an already formed subroutine or omitting several lines of program. Thus, a program can be corrected using these five codes, and the interruption processing program can be sufficiently realized by a very short flow. Though, so-called data reference code system is employed in the above description, it is possible to replace the program data in the program correction circuit 3B with ordinary instruction code. Since the bugs of the program are generally corrected by adding the existing subroutines or deleting several program statement lines, the interruption program for correction is expressed by using these five codes. Of course, interruption processing codes may be added as needed to provide flexibility.

Figure 10:
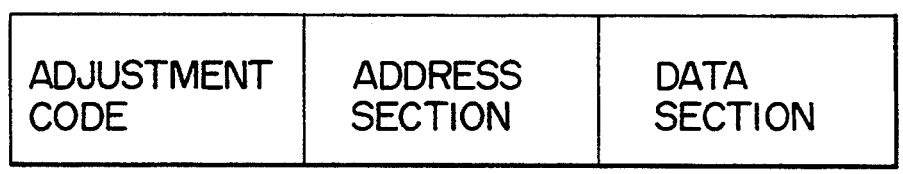
FIG. 10 shows a format of data communicated upon execution of the adjustment program in FIG. 8.
Figure 9:
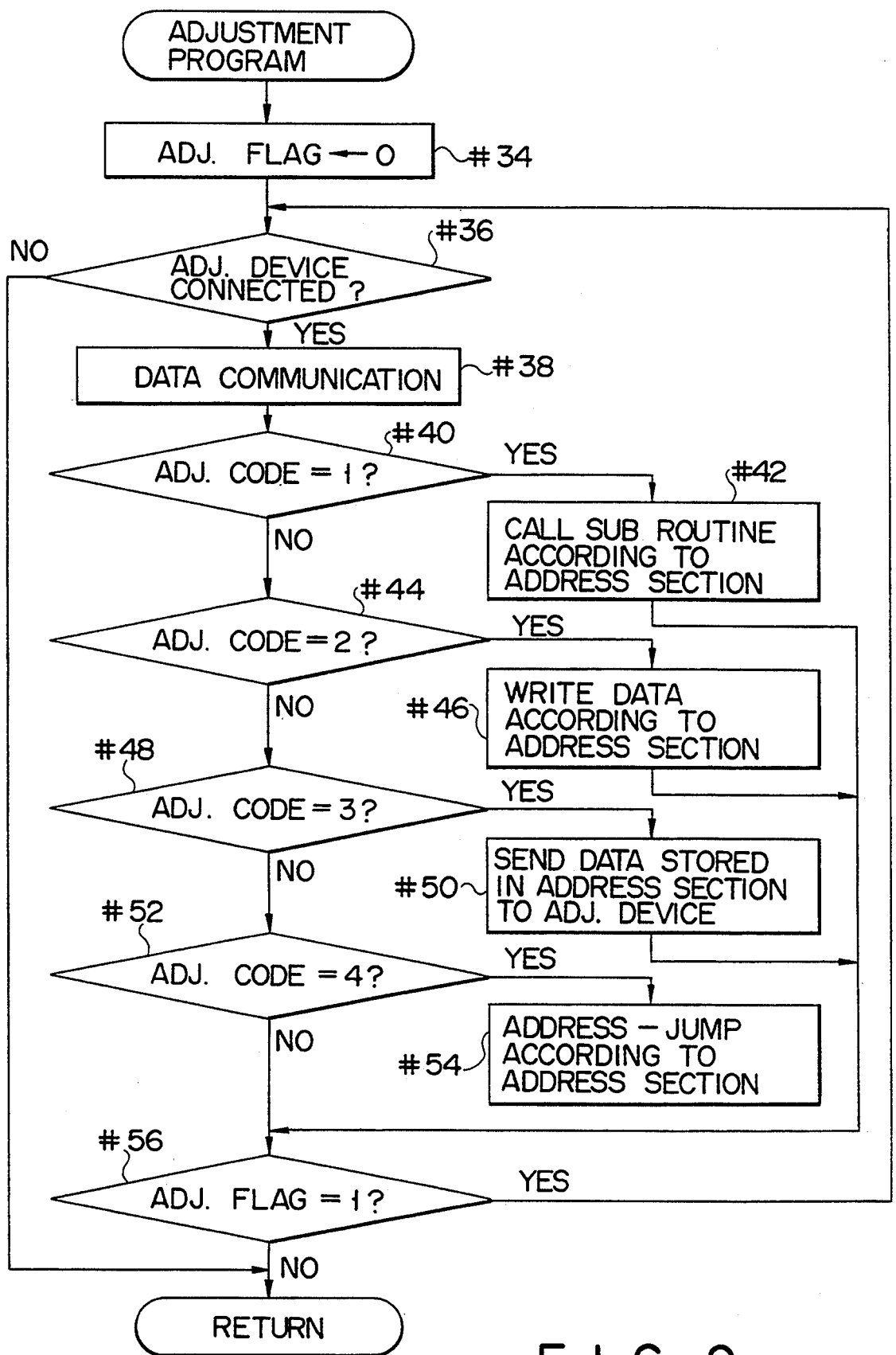
FIG. 9 is a flow chart showing the contents of an adjustment program in FIG. 8.

FIG. 9 is a flow chart showing the contents of the adjustment program executed in step #14 of the interruption processing shown in FIG. 8. In step #34, 0 is set in an adjustment flag in order to execute the adjustment program once. The adjustment program routine is returned to the original routine at step #56 if the adjustment flag is 0. In order to successively execute the adjustment program many times, an adjustment device (not shown) connected to the microcomputer sends such data at step #38 that set 1 in the adjustment flag at step #46. It is determined at step #36 whether or not the adjustment device is connected to the microcomputer by checking the contents of I/O ports. If NO in step #36, the flow returns to the main routine; otherwise, data communication is executed with the adjustment device in step #38. Communication data sent from the adjustment device comprises an adjustment code, an address section, and a data section, as shown in FIG. 10.

It is determined in step #40 whether or not the contents of the adjustment code are 1. If YES in step #40, a subroutine stored at an address of the program memory 2 indicated by the address section of the communication data is called in step #42. If NO in step #40, it is determined in step #44 whether or not the contents of adjustment code are 2. If YES in step #44, data in the data section of the communication data is written at an address of the program correction circuit 3B indicated by the address section of the communication data. If NO in step #44, it is determined in step #48 whether or not the contents of the adjustment code are 3. If YES in step #48, data at an address of the program correction circuit 3B indicated by the address section of the communication data are sent to the adjustment device. If NO in step #48, it is determined in step #52 whether or not the contents of the adjustment code are 4. If YES in step #52, the contents of the program counter 1 are caused to Jump to the address indicated by the address section of the communication data. If NO in step #52, it is determined in step #56 whether or not the adjustment flag is 1. If NO in step #56 (i.e., one time execution mode), the flow returns to the main routine; otherwise (i.e., successive execution mode), the flow returns to step #36, and the above-mentioned operations are repeated.

The adjustment device writes an address of the program memory at which the program data to be corrected is stored, and an adjustment code "1" in the program correction circuit 3B, and waits for start of data communication for adjustment with the microcomputer. In the microcomputer, when the address of the program correction circuit 3B coincides with the address designated by the program counter 1, an interruption occurs, and since the adjustment flag is "1", data communication with the adjustment device is started. The adjustment device writes correction data in the communication data. When a plurality of subroutines are to be executed upon adjustment, the adjustment code is set to be "1" in the first communication, and a subroutine call is repeated in a plurality of communications. Thus, adjustment can be performed in any steps of the program of the microcomputer. In addition, a portion to be adjusted can be easily added by rewriting the contents of the program correction circuit 3B.

Figure 11:
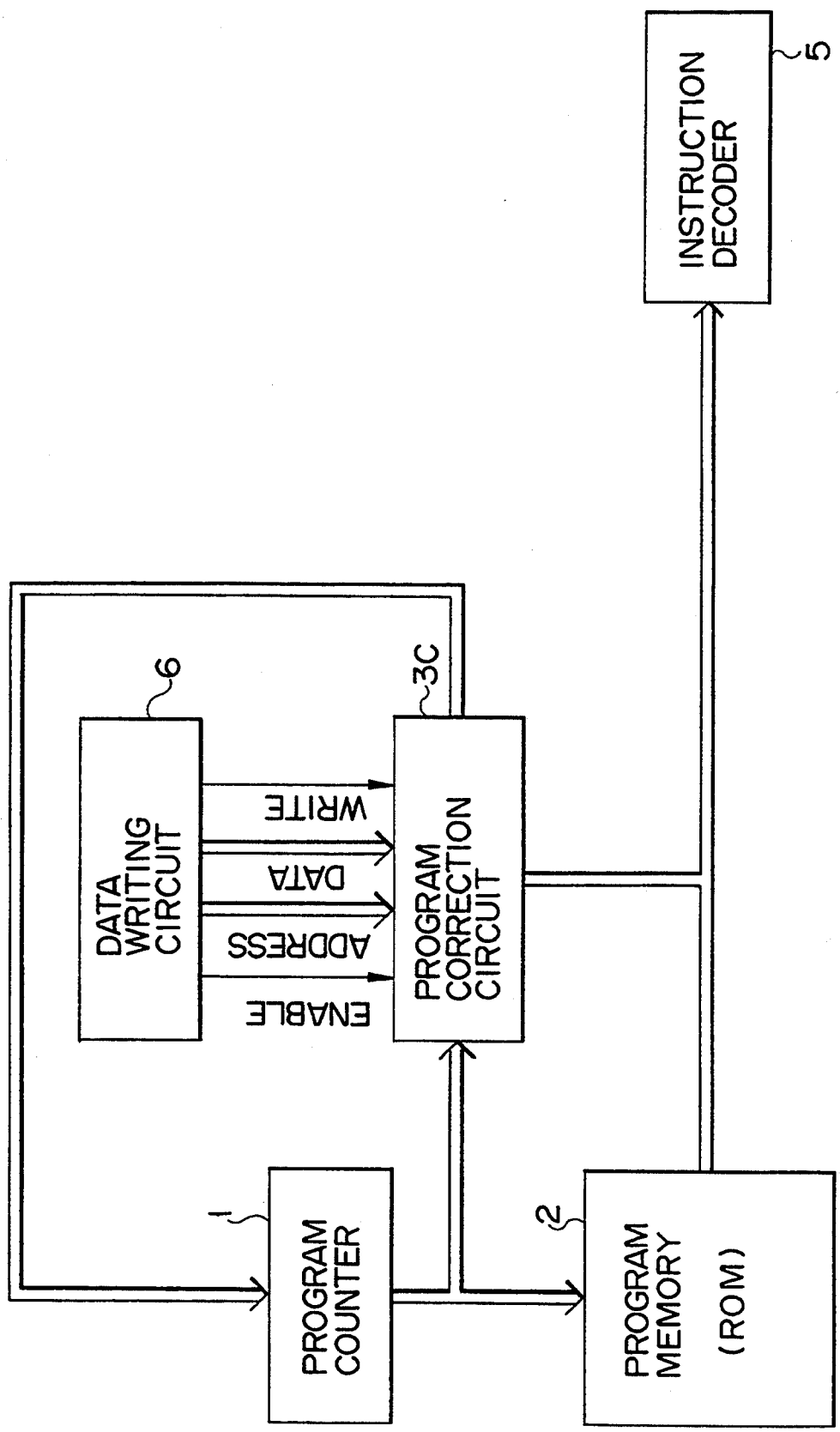
FIG. 11 is a block diagram showing the fourth embodiment of a microcomputer according to the present invention.

The third embodiment exemplifies a case wherein an interruption processing is executed by means of software. The fourth embodiment wherein the address of the interruption processing is designated by a vector address will be described below. FIG. 11 is a block diagram of the fourth embodiment. An output from the program counter 1 is supplied to the program memory 2 and a program correction circuit 3C. The program correction circuit 3C controls a count value of the program counter 1.

FIG. 12 is a block diagram of the program correction circuit 3C. The program correction circuit 3C has a plurality of program correction units 3C-1 to 3C-m arranged in correspondence with the number of program data to be corrected. Each of the units 3C-1 to 3C-m comprises a PROM 31 having an address data area 32 and a vector address area 34, and a comparator 36. The address data area 32 stores an address of the program memory 2 at which an interruption is to be generated, and the vector address area 34 stores the start address of interruption processing as the vector address. The contents of the program counter 1 are input to all the program correction units 3C-1 to 3C-m, and are compared with data in the address data area 32 by the comparator 36. When a coincidence is detected between the two addresses, an output enable signal is supplied to the vector address area 34 in the program correction unit in which the coincidence is detected, and the data output from the vector address area 34 is supplied to a count value change circuit 38.

The output from the comparator 36 of each program correction unit is input to an interruption circuit 42 through an OR gate 40. For this reason, when a coincidence is detected in one of the program correction units 3C-1 to 3C-m and the contents of an interruption enable flag 44 indicate an enable state, an interruption occurs, and the address data output from the vector address area 34 of the program correction unit in which the coincidence between the two addresses is detected is written in the program counter 1 by means of the count value change circuit 38. At the same time, the contents of the program counter 1 are saved in a stack (not shown), as a matter of course. When the contents of the interruption enable flag 44 indicate a disable state, the contents of the program counter 1 are left unchanged.

Figure 13:
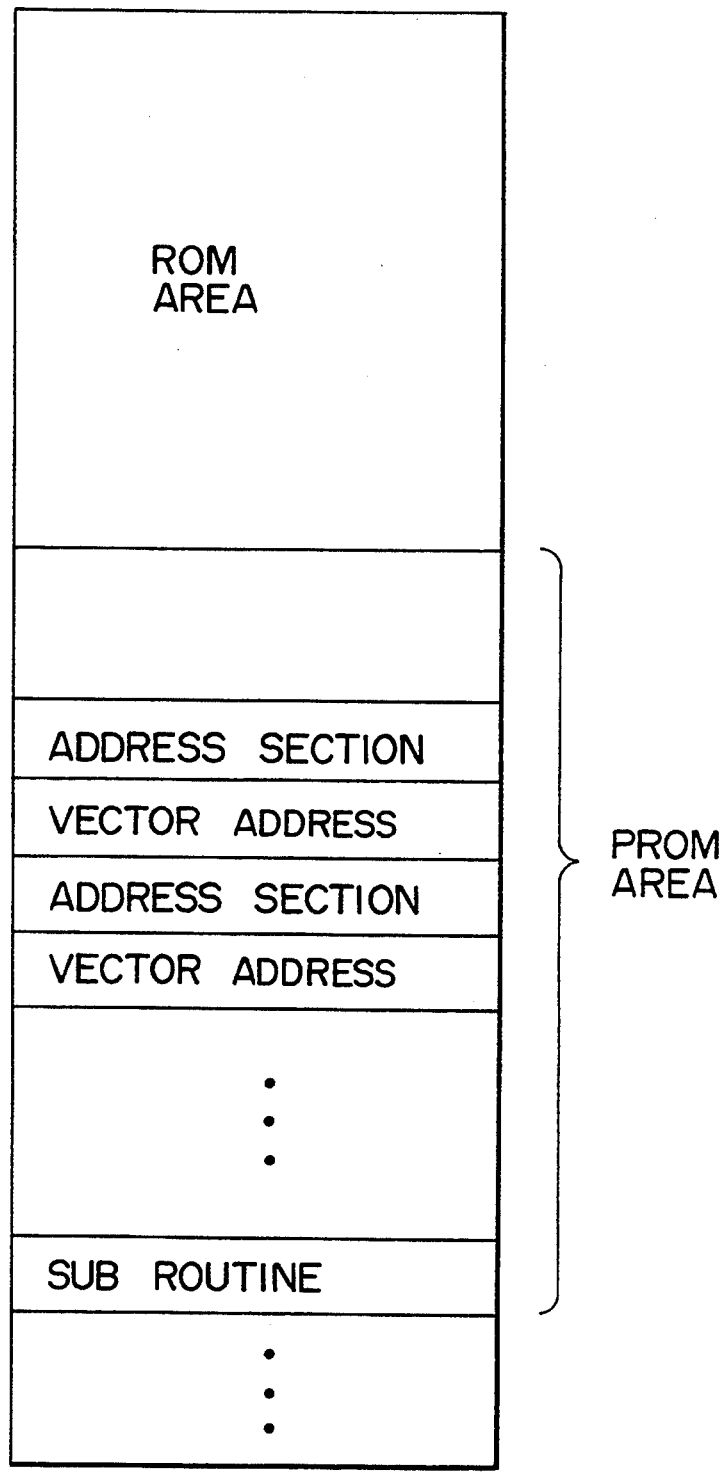
FIG. 13 shows a memory map of the fourth embodiment.

FIG. 13 shows a memory map of the fourth embodiment. A normal program is written in a ROM area, and a PROM area need not be used. Though, the PROM 31 is included in the program correction circuit 3C, the PROM area follows the ROM area in the memory map. When the program in the ROM area is to be corrected, addresses at which the program data to be corrected are sequentially written in the address sections of the PROM area, and the start addresses of the processing to be executed are written in the vector addresses following the address sections. When a required subroutine has already been written in the ROM area, the start address of the subroutine is written in the vector address. However, when a required subroutine is not written in the ROM area, a new subroutine is added to the PROM area, and its start address is written in the vector address. The number of addresses for generating an interruption is determined by the number of address sections. In general, the number of addresses can be 5.

According to the third and fourth embodiments, when a bug is found in a program written in the program memory or the program is to be partially corrected, the interruption processing is executed to substantially add or delete program data without rewriting the contents of the program memory, thus correcting the program.

In the fourth embodiment, an interruption instruction is supplied to the count value change circuit 38 using the interruption circuit 42. However, the interruption circuit 42 can be omitted, and an interruption instruction can be directly supplied to the count value change circuit 38 on the basis of the output from the OR gate 40. In this case, stack processing is not executed, and an address jump is directly executed. Therefore, a jump instruction to a return address must be written at the last line of the correction program.

In the above embodiments, data write access from the data writing circuit 6 uses an exclusive terminal for writing. However, a common terminal system may be employed wherein write access is executed when an external terminal (e.g., a port terminal) of a one-chip microcomputer is set in a write mode. Furthermore, a system in which data is written by a program upon connection to the instruction decoder 5 may be employed. In the above embodiments, the PROM of the program correction circuit is incorporated in the microcomputer. However, the PROM may be externally connected to the microcomputer.

Figure 14:
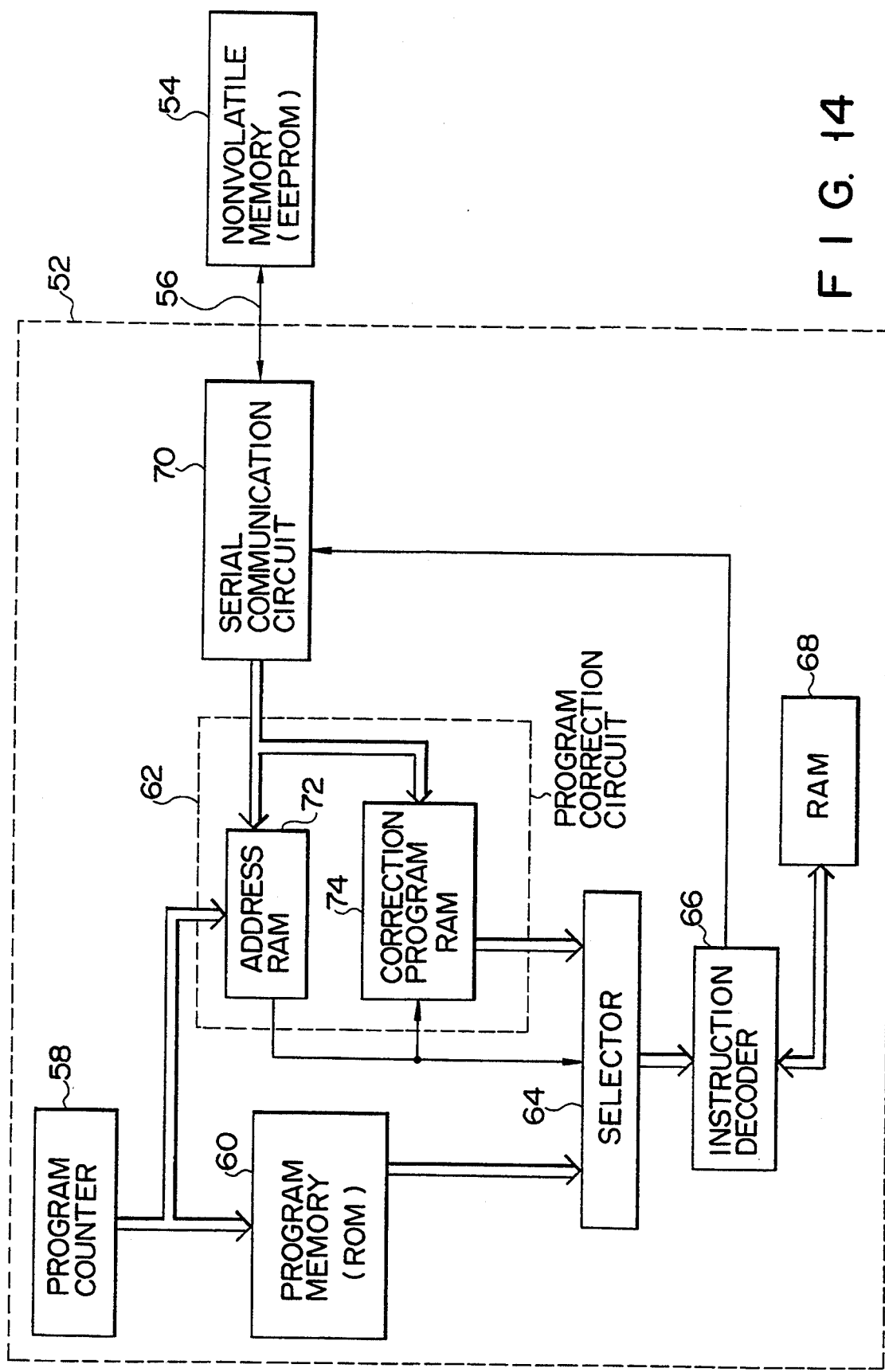
FIG. 14 is a block diagram showing the fifth embodiment of a microcomputer according to the present invention.

An embodiment wherein an external PROM for correcting a program is connected to a microcomputer will be described below. FIG. 14 is a block diagram of a microcomputer system according to the fifth embodiment. The system of this embodiment comprises a one-chip microcomputer 52, and a nonvolatile memory 54 which is externally connected to the microcomputer 52 and stores data to be set in the one-chip microcomputer 52. The microcomputer 52 and the nonvolatile memory 54 are connected through a signal line (e.g., a serial communication wiring) 56.

The one-chip microcomputer 52 comprises a program counter 58, a program memory 60 comprising a mask ROM for storing program data, a program correction circuit 62 having a RAM, a selector 64, an instruction decoder 66, a main memory RAM 68, and a serial communication circuit 70. The serial communication circuit 70 is connected to the nonvolatile memory 54 through the signal line 56. The program counter 58 is connected to supply address data not only to the program memory 60 but also to the program correction circuit 62. The program correction circuit 62 has an address RAM 72 and a correction program RAM 74 which respectively store address data of indicating an address of the memory 60 storing program data to be corrected and correction program data in order to debug the program written in the program memory 60 or partially correct the program.

The detailed arrangement of the program correction circuit 62 is the same as that of the first or second embodiment shown in FIG. 3 or 4. These address data and program data are stored in the nonvolatile memory 54, and are loaded in the RAMs 72 and 74 through serial communication via the serial communication circuit 70 in response to an instruction immediately after a power-on reset operation. The program correction circuit 62 is substantially equivalent to the nonvolatile memory 54. The selector 64 normally selects output data from the program memory 60, and supplies selected data to the instruction decoder 66. When the address data stored in the address RAM 72 coincide with the output data of the program counter 58, the selector 64 selects the correction program data stored in the correction program RAM 74 whose address is designated by the vector table address upon this coincidence in place of output data (program data to be corrected) from the program memory 60, and supplies the selected data to the instruction decoder 66.

The nonvolatile memory 54 can employ an electrically erasable PROM (EEPROM), an ultraviolet erasable ROM (EPROM), a one-time PROM, or a conventional battery backup RAM. In this embodiment, an EEPROM capable of performing serial communication is used. Most of products, e.g., cameras to which the microcomputer system of this embodiment is applied use EEPROMs as storages for adjustment data after assembly of the products, and a cost per bit of an EEPROM is considerably reduced. Thus, a remaining portion of the EEPROM other than the adjustment data storage portion can be used as the nonvolatile memory 54 for storing program correction data, so that a program can be corrected without increasing a product cost.

According to the fifth embodiment, program correction addresses and correction programs are stored in the nonvolatile memory 54 connected to the one-chip microcomputer 52 through the signal line 56, and the addresses and programs are loaded and stored in the memories 72 and 74 of the microcomputer 52 in response to an instruction immediately after the operation of the one-chip microcomputer 52 is started, e.g., a power-on reset operation. Each address stored in the RAM 72 is compared with the contents of the program counter 58, and when a coincidence between the two addresses is detected, the corresponding correction program is executed, thus correcting the contents of the program memory 60 in the same manner as in the above embodiments, and further providing the following advantages. The first to fourth embodiments can be realized by a relatively simple circuit arrangement. However, a process of forming an electrically programmable nonvolatile memory in a one-chip microcomputer manufactured in a CMOS process must be added. As a result, a cost of the one-chip microcomputer is undesirable increased. The capacity of the incorporated nonvolatile memory is not always entirely used but is not often entirely used, resulting in a wasteful capacity.

According to the fifth embodiment, correction data are written in a nonvolatile memory externally connected to the one-chip microcomputer, and are serially transferred to the memories in the one-chip microcomputer immediately after power-on of the one-chip microcomputer. Therefore, the one-chip microcomputer can be realized without changing the CMOS process, and the above-mentioned drawbacks will not be posed. Since data are loaded in the microcomputer by serial communication, ports can be effectively used as compared to a microcomputer of another type in which a program memory can be externally extended by a parallel data communication type device by switching ports and address and data buses.

Figure 15:
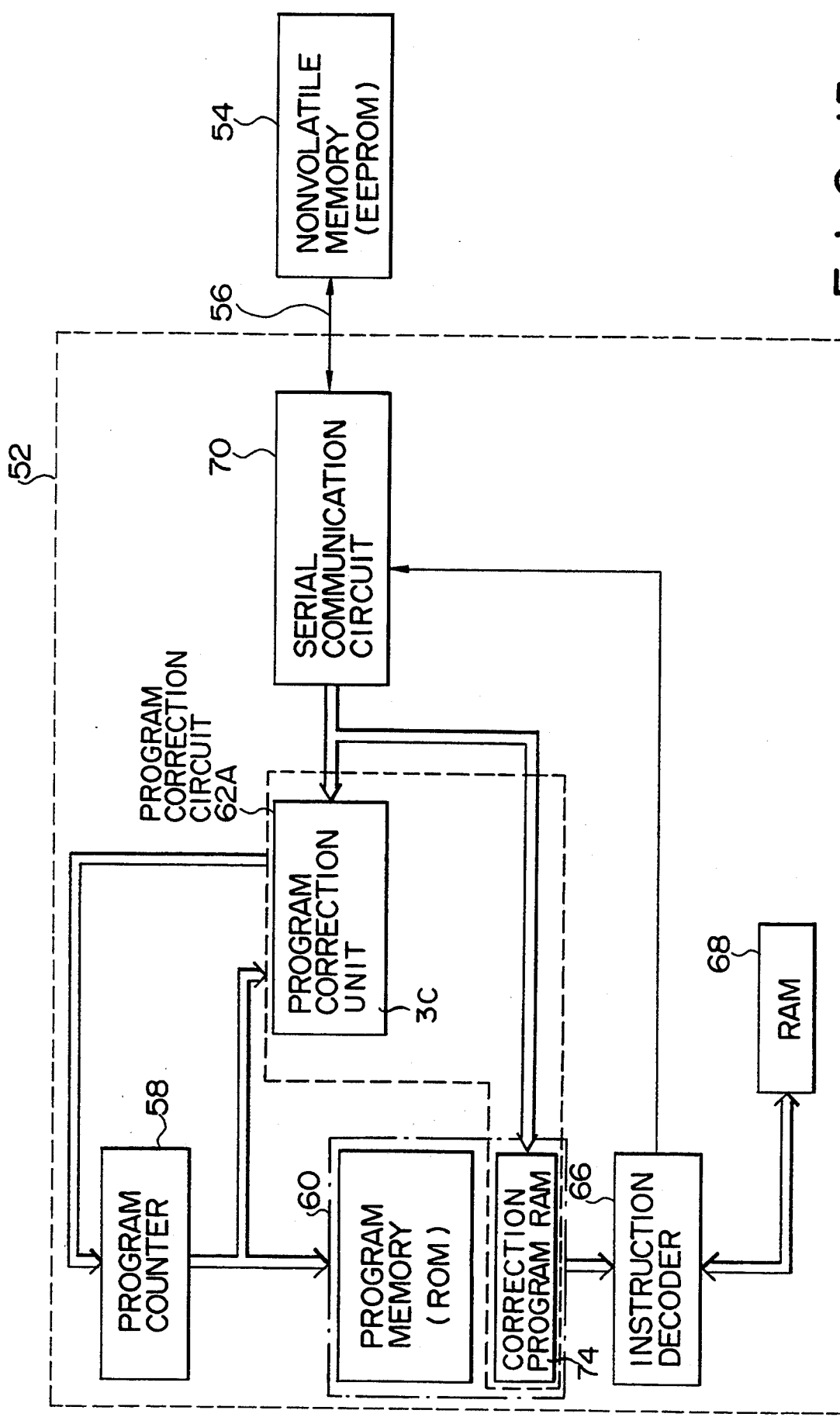
FIG. 15 is a block diagram showing the sixth embodiment of a microcomputer according to the present invention.
Figure 16:
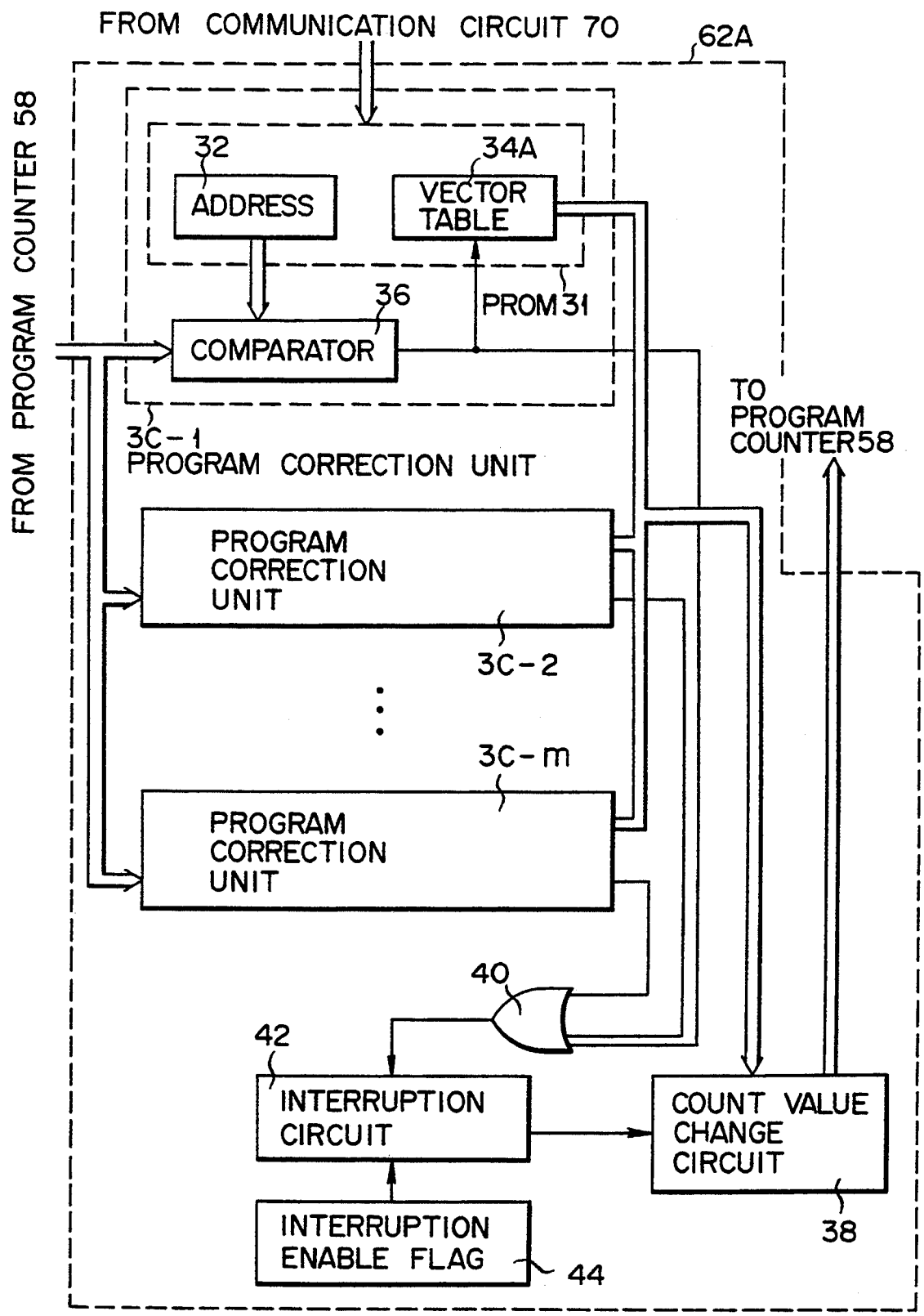
FIG. 16 is a block diagram of a program correction circuit of the sixth embodiment.

The sixth embodiment for correcting a program by means of an interruption processing will be described below. FIG. 15 is a block diagram of a one-chip microcomputer according to the sixth embodiment. The program counter 58 is connected to supply address data not only to the program memory 60 but also to a program correction circuit 62A. The program correction circuit 62A comprises a program correction unit 3C and a correction program RAM 74. The detailed arrangement is shown in FIG. 16. The program correction circuit 62A has a plurality of program correction units 3C-1 to 3C-m arranged in correspondence with the number of program data to be corrected. Each of the units 3C-1 to 3C-m connected to the serial communication circuit 70 and comprises a RAM 31A having an address data area 32 and a vector table 34A, and a comparator 36. The address data area 32 stores an address of the program memory 2 at which an interruption is to be generated, and the vector table 34A stores the predetermined vector address. The contents of the program counter 1 are input to all the program correction units 3C-1 to 3C-m, and are compared with data in the address data area 32 by the comparator 36. When a coincidence is detected between the two addresses, an output enable signal is supplied to the vector table 34A in the program correction unit in which the coincidence is detected, and the data output from the vector table 34A is supplied to a count value change circuit 38. The arrangement of the remaining portion is the same as that of FIG. 12.

FIG. 17 shows a data map of the EEPROM 54. More specifically, an area of the EEPROM 54 up to a predetermined address is assigned as an adjustment data area, and an area after the predetermined address (in this case, after an address hhh) is assigned as a program correction data area. The program correction data area is divided into an area for correction address data Ai (i=i to m), an area for size data Bi (i=1 to m) of a correction program Pi (i=1 to m), and an area for the correction program Pi. Data in the program correction data area comprises a set of correction address data Ai in the correction address data area (memory addresses hhh to hhh+m−1), correction program size data Bi in the correction program size data area (memory addresses hhh+m to hhh+2m−1), and correction program data Pi in the correction program data area (memory addresses hhh+2, . . . ).

More specifically, in the correction address data area, first correction address data A1 of the program memory is set at the address hhh, and when there are second, third, ..., mth correction address data A2, A3, ..., Am, they are sequentially written at addresses after the address hhh+1. In this case, the number of portions to be corrected of the program memory is limited to m by the capacity of the address RAM 72. Therefore, a maximum of m portions of the program can be corrected. If the number of the program data to be corrected is smaller than m, an address of the ROM 60 which is never corrected, e.g., data 0000(H), is set in the remaining portion of the correction address data area. When the contents of the program counter 58 indicates this address 0000(H), generation of a control signal from the program correction circuit 62, which signal switches the selector 64 to the program correction circuit 62 side, is prohibited.

In the correction program size data area, correction program size data B1 to Bm indicating sizes (capacities) of correction programs paired with the first to mth address data A1 to Am are sequentially set at addresses after the address hhh+m. In this case, when the number of program data to be corrected is smaller than m, data 0000(H) is set in the remaining portion of the correction program size data area.

In the correction program data area, correction program data P1 to Pm indicating contents of correction programs, which are paired with the first to mth address data A1 to Am are sequentially set at addresses after the address hhh+2m. In this case, the start address of the correction program data P2 is hhh+2m+B1+1, and the start address of the correction program data Pm is hhh+2m+B1+B2+...+B(m−1)+1. In this case, when the number of program data to be corrected is smaller than m, data 0000(H) is set in the remaining portion of the correction program size data area.

The operation of the sixth embodiment will be described below. The operation of this microcomputer is basically the same as that of the conventional microcomputer, except that a portion of the program written in the program memory 60 is substantially rewritten to correct the program. More specifically, data in the program correction data area of the EEPROM 54 are loaded in the microcomputer 52 through serial communication via the serial communication circuit 70 in response to an instruction immediately after a power-on reset operation of the one-chip microcomputer 52. In this case, address data in the correction address data area are sequentially set in the address data area 32 (FIG. 16), and data of an address at which correction program data is set and which is calculated based on the correction program size data in the correction program size data area, and correction program data in the correction program data area are sequentially set in the correction program RAM 74.

In general, program data read out from the program memory 60 addressed by the program counter 58 which is incremented in response to system clocks (not shown) is supplied to the instruction decoder 66, thus executing the program. However, when the address data stored in the address area 32 coincides with the output data of the program counter 58 and program data corresponding to that address is output from the correction program RAM 74, the output data (corrected program data) is input to the instruction decoder 66. Thus, a substantially rewritten program is decoded by the instruction decoder 66, and the corrected program is executed.

Figure 18:
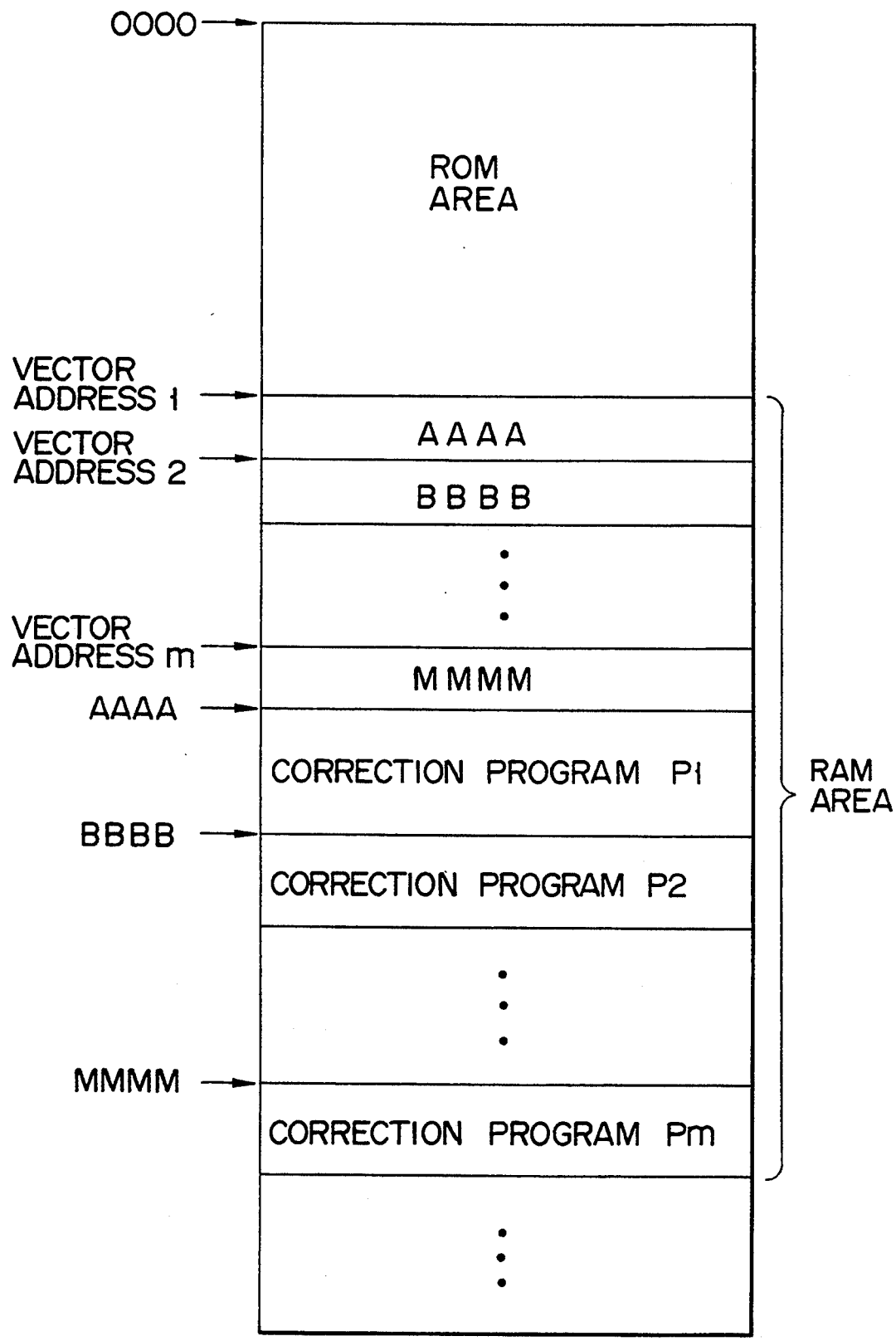
FIG. 18 shows a memory map of the sixth embodiment.

FIG. 18 shows a memory map of the sixth embodiment when the program memory 60 and the correction program RAM 74 are allocated in the same address space. Addresses of the RAM 74 area are assigned after addresses of the ROM area. In the RAM area, correction program data P1 to Pm are sequentially set after vector addresses 1 to m. In this case, address data AAAA for Jumping to the start address of the correction program data P1 is set in the vector address 1. Address data BBBB to MMMM for jumping to the start addresses of the correction program data P2 to Pm are set in the vector addresses 2 to m. These address data BBBB to MMMM are calculated and set in accordance with correction program size data immediately after data are loaded from the EEPROM 54.

The operation of the program correction circuit 62A is described. A sequence for correcting a program in the program memory using the first correction program P1 will be explained below. It is assumed that correction address data A1 is set in the address data area 32 (FIG. 16) of the RAM 31A of the program correction circuit 62A. When the correction address data A1 set in the address data area 32 coincides with the output data of the program counter 58, the comparator 36 (FIG. 16) outputs an output enable signal to the vector table 34A (FIG. 16), and only a data output (vector address 1 in FIG. 18) of this vector table 34A is supplied to the count value change circuit 38 (FIG. 16). At the same time, the output from the comparator 36 is input to the interruption circuit 42 through the OR gate 40. If the interruption enable flag is enabled, an interruption occurs, and the vector address 1 from the vector table 34A is input to the count value change circuit 38 upon this interruption. Thus, with reference to data AAAA of the vector address 1, the contents of the program counter 58 is changed to AAAA. Therefore, the correction program data P1 stored in the program correction circuit 62A is supplied to the instruction decoder 66. Thus, a substantially rewritten program is decoded by the instruction decoder 66, and the first correction program P1 is executed. As a result, the contents at the address AAAA of the program memory 60 can be corrected. Note that if an instruction for decrementing a stack pointer by one and a Jump instruction to a return address in the ROM area are written at the last line of the correction program P1, a program having an arbitrary length in the ROM can be rewritten with a program having an arbitrary length in the memory of the program correction circuit. In general, an RETI instruction (restore instruction from an interruption) can be written at the last line of the correction program, so that an instruction next to the interrupted instruction can be consecutively executed.

The seventh embodiment will be described below. The seventh embodiment is based on the fact that when a bug in a program can be corrected by correcting only one or two portions and aims to correct only one arbitrary portion of a program. The block diagram of the seventh embodiment is the same as that of the fifth embodiment shown in FIG. 14, and is omitted. The detailed construction of the program correction circuit 62 is the same as that of the first or second embodiment shown in FIG. 3 or FIG. 4. A difference from the fifth embodiment is that the data format of the EEPROM 54 is simplified as shown in FIG. 19.

More specifically, in the EEPROM 54, an adjustment data area up to a predetermined address, and a program correction data area after the predetermined address are assigned, as shown in FIG. 19. A plurality of pairs of correction address data and correction program corresponding to in number to the program data to be corrected are sequentially set in the program correction data area. In this case, data 0000(H) is set in the remaining portion of the correction address data area.

In the seventh embodiment, the program is corrected by replacing a program code with another program code. FIG. 20 shows a case wherein a program code is changed to a code having the same length. More specifically, when a 2-byte instruction code "9A, 0E" starting from a program memory (ROM) address 107A is corrected to a 2-byte instrue, ion code "9B, 3D", pairs of correction address data and 1-byte correction program data of the correction program "107A, 9B" and "107B, 3D" are sequentially written at correction address areas 1 and 2 and correction program areas 1 and 2 in the program correction data area (EEPROM address area), as shown in FIG. 20.

FIG. 21 shows a case wherein a program code is changed to a shorter code. More specifically, when a 2-byte instruction code "9A, 0E" starting from the ROM address 107A is changed to a 1-byte instruction code "C1", one of the contents of the two addresses at which the 2-byte instruction code is written are rewritten with an NOP instruction code (e.g., "00"). As shown in FIG. 21, pairs of correction address data and 1-byte data of the correction program "107A, C1" and "107B, 00" are sequentially written at correction address areas 1 and 2 and correction program areas 1 and 2 in the EEPROM address area.

A 3-byte or more correction code can be corrected according to correction of the 2-byte instruction code described above.

A method of changing a program code to a longer code will be described below. FIG. 22 exemplifies a case wherein a 1-byte instruction code "C1" at a ROM address 3A02 is corrected to a 3-byte instruction code "79, 46, B3" as an example of correcting a 1-byte instruction code to a 3-byte instruction code. In this case, it is assumed that codes "9A" and "0E" are written at ROM addresses 3A03 and 3A04, as shown in FIG. 22. In the program correction data area of the EEPROM, pairs of correction address data and 1-byte program data of the correction program are successively written in correction address areas 1 to 11 and correction program areas 1 to 11. It is assumed that the 1-byte instruction code "90" is an instruction for Jumping to the following 2-byte code, and an area after a ROM address C000 is not used by the program of the one-chip microcomputer of the present invention.

A sequence for actually executing a program for changing the 1-byte instruction code "C1" to the 3-byte instruction code "79, 46, B3" will be described below. When the data in the correction address areas 1 to 3 coincide with the ROM addresses 3A02 to 3A04, the code "C1" is rewritten as the code "90" when the ROM address 3A02 is designated, the code "9A" is rewritten as the code "C0" when the ROM address 3A03 is designated, and the code "0E" is rewritten as the code "00" when the ROM address 3A04 is designated. Thus, the instruction code "90" is executed to jump the control to the ROM address C000 which is not used by the program of the one-chip microcomputer of the present invention. An area from the ROM address C000 can be desirably used since it is an empty area.

When data in the correction address areas 4 to 6 coincide with ROM addresses C000 to C002 in turn, the 3-byte instruction code "79, 46, B3" to be corrected which is written in the correction program areas 4 to 6 is executed. When data in the correction address areas 7 and 8 coincide with ROM addresses C003 and C004 in turn, the same code "9A, 0E" as the 2-byte code at the ROM addresses 3A03 and 3A04 which is written in the correction program areas 7 and 8 is executed. More specifically, the instruction at the addresses 3A03 and 3A04 which are omitted by an address jump to C000 is executed here.

When data in the correction address areas 9 to 11 coincide with ROM addresses C005 to C007 in turn, the Jump instruction "90", and a code "3A, 05" at a Jump destination, which are written in the correction program areas 9 to 1 are executed, and the control returns to the ROM address 3A05.

In the above-mentioned operation, a 1-byte instruction code is corrected to a 3-byte instruction code, and the 3-byte code is executed. When the above correction method is used, a longer program can be executed in place of ROM codes.

As described above in detail, according to the microcomputer of the present invention, an address denoting a portion to be corrected of the program memory, and correction program data representing a correction contents are stored in the nonvolatile memory incorporated in the microcomputer or stored in the external nonvolatile memory. In the latter case, the stored data are transferred to the internal memory immediately after power-on of the microcomputer. When the address of the program counter coincides with the stored address, a program is corrected in accordance with the correction program data. Thus, when a bug is found in a program written in the program memory comprising, e.g., a ROM or the program is to be partially corrected, a program can be partially and substantially rewritten without rewriting the contents of the ROM, thereby correcting the program, or a program is substantially added or deleted upon interruption processing, thereby correcting the program.

Additional advantages and modifications will readily occur to those skilled in the art. Therefore, the invention in its broader aspects is not limited to the specific details, representative devices, and illustrated examples shown and described herein. Accordingly, various modifications may be made without departing from the sprit or scope of the general inventive concept as defined by the appended claims and their equivalents.

What is claimed is:

1. A microcomputer system comprising:
   a one-chip microcomputer for controlling the microcomputer system based on a stored program, said one-chip microcomputer including on the one-chip thereof program memory means for storing a program data, program counter means for addressing said program memory means, and instruction decoder means for decoding the program data read out from said program memory means addressed by said program counter means; and
   programmable nonvolatile memory means, arranged as a different chip from said one-chip microcomputer and being connected to said one-chip microcomputer, said programmable nonvolatile memory means having a first storage area for storing a pair of an address data denoting an address where a program data to be corrected is stored and a correction program data, and a second storage area for storing adjustment data for adjusting said microcomputer system,
   said one-chip microcomputer further comprising:

serial communication means for serially communicating with said nonvolatile memory means to receive the address data and the correction program data from the first storage area of said nonvolatile memory means upon power-on of said microcomputer;

first memory means for storing the address data received by said serial communication means;

comparison means for comparing the output from said program counter means with the address data stored in said first memory means, and outputting a coincidence signal when a coincidence is detected therebetween;

second memory means for storing the correction program data received by said serial communication means, and outputting the correction program data in response to the coincidence signal; and selection means for receiving the output from said program memory means and the output from said second memory means, for supplying the output from said second memory means to said instruction decoder means in response to the coincidence signal, and supplying the output from said program memory means to said instruction decoder means when the coincidence signal is not output.

2. A microcomputer system comprising:

a one-chip microcomputer for controlling the microcomputer system based on a stored program, said one-chip microcomputer including program counter means and program memory means;

programmable nonvolatile memory means for storing first and second data, the programmable nonvolatile memory means being arranged as a different chip from said one-chip microcomputer, and wherein data is transmitted from said programmable nonvolatile memory means to a volatile memory means in said one-chip microcomputer;

comparison means for comparing the first data from said programmable nonvolatile memory means with an output from said program counter means, and for outputting a coincidence signal when a coincidence is detected therebetween;

means for correcting a value of said program counter means in response to the coincidence signal;

selection means for selecting an execution processing with reference to the corrected value of said program counter means and the second data from said programmable nonvolatile memory means; and means for restoring the value of said program counter means to a value just succeeding an interruption value after selection of the execution processing by said selection means is completed.

3. A system according to claim 2, in which the execution processing selected by said selection means includes data communication with an external device.

4. A microcomputer system comprising:

a one-chip microcomputer for controlling the microcomputer system based on a stored program, said one-chip microcomputer including program counter means, program memory means, and instruction decoder means;

programmable nonvolatile memory means arranged as a different chip from said one-chip microcomputer;

selection means for selecting one of data from said program memory means and data from said programmable nonvolatile memory means in accordance with data from said programmable nonvolatile memory means, and for supplying the selected data to said instruction decoder means; and wherein:

said nonvolatile memory means stores an address data and a program data, outputs the program data to said selection means when the address data coincides with the output from said program counter means, and outputs predetermined fixed data to said selection means when the address data does not coincide with the output from said program counter means, and said selection means comprises means for detecting whether or not a data from said nonvolatile memory means is the fixed data, and for, when the data output from said nonvolatile memory means is the fixed data, outputting a switching signal, and means for selecting one of the data from said program memory means and the data from said nonvolatile memory means in accordance with the switching signal and supplying the selected data to said instruction decoder means.

5. A microcomputer system comprising a one-chip microcomputer including a program memory means for storing a program data, a program counter means for addressing said program memory means, and an instruction decoder means for decoding the program data read out from said program memory means addressed by said program counter means;

first nonvolatile memory means, which is electrically programmable, having a first storage area for storing a pair of an address data denoting an address of said program memory means where a program data to be corrected is stored, and a second storage area for storing adjustment data for adjusting said microcomputer system, the first nonvolatile memory means being arranged as a different chip from said one-chip microcomputer;

comparison means for comparing an output from said program counter means with the address data stored in said first nonvolatile memory means, and for outputting a coincidence signal when a coincidence is detected therebetween;

second nonvolatile memory means, which is electrically programmable, for storing a correction program data, and for outputting the correction program data in response to the coincidence signal, the second nonvolatile arranged as a different chip from said one-chip microcomputer; and selection means for receiving the output from said program memory means and an output from said second nonvolatile memory means, for, when the coincidence signal is output, supplying the output from said second nonvolatile memory means to said instruction decoder means, and for, when the coincidence signal is not output, supplying the output from said program memory means to said instruction decoder means, said selection means including inhibition means for inhibiting the program data stored in said second nonvolatile memory means from being supplied to said instruction decoder means even when the output of said program counter means coincides with data stored in said first nonvolatile memory means; and said inhibition means including means for inhibiting the program data stored in said second nonvolatile memory means from being supplied to said instruction decoder means when the output of said program counter means coincides with the address data stored in said first nonvolatile memory means and the address data has a predetermined value.

6. A microcomputer system comprising:
a one-chip microcomputer for controlling the microcomputer system based on a stored program; and
programmable nonvolatile memory means, arranged as a different chip from said one-chip microcomputer and being connected to said one-chip microcomputer, said programmable nonvolatile memory means having a first storage area for storing a pair of an address data denoting an address where a program data to be corrected is stored and a correction program data, and a second storage area for storing adjustment data for adjusting said microcomputer system;
said one-chip microcomputer comprising:
program memory means for storing a program data;
program counter means for addressing said program memory means;
instruction decoder means for decoding the program data read out from said program memory means addressed by said program counter means;
serial communication means for serially communicating with said nonvolatile memory means to receive, substantially at the same time, the address data and the correction program data from the first storage area of said nonvolatile memory means upon power-on of said microcomputer;
volatile memory means for storing the address data and the correction program data received by said serial communication means;
comparison means for comparing the output from said program counter means with the address data stored in said volatile memory means, and outputting a coincidence signal when a coincidence is detected therebetween; and
means for supplying the correction program data stored in said volatile memory means to said instruction decoder means in response to the coincidence signal; and wherein:
said supplying means comprises inhibition means for inhibiting the correction program data stored in said programmable nonvolatile memory means from being supplied to said instruction decoder means even when the output of said program counter means coincides with an address data stored in said programmable nonvolatile memory means.

7. A microcomputer system comprising:
a one-chip microcomputer including a program memory means for storing a program data, a program counter means for addressing said program memory means, and an instruction decoder means for decoding the program data read out from said program memory means addressed by said program counter means;
first electrically programmable memory means for storing a correction address data denoting an address of said program memory means where a program data to be corrected is stored, said first electrically programmable memory means being arranged on a different chip from said one-chip microcomputer;
comparison means for comparing an output from said program counter means with the correction address data stored in said first electrically programmable memory means, and for outputting a coincidence signal when a coincidence is detected therebetween;
second electrically programmable memory means for storing a correction program data, and for outputting the correction program data in response to the coincidence signal, said second electrically programmable memory means being arranged on a different chip from said one-chip microcomputer; and
selection means for receiving the output from said program memory means and an output from said second electrically programmable memory means, for, when the coincidence signal is output, supplying the output from said second electrically programmable memory means to said instruction decoder means, and for, when the coincidence signal is not output, supplying the output from said program memory means to said instruction decoder means;
said correction program data stored in said second electrically programmable memory means comprising non-operation instructions by a number of steps corresponding to a difference between a number of steps of a program data to be corrected and that of steps of he correction program data when the former number is larger than the latter number.

8. A microcomputer according to claim 7, in which said first and second electrically programmable memory means comprise nonvolatile memory means.

9. A microcomputer according to claim 7, in which said first and second electrically programmable memory means comprise random access memories, and said correction address data and said correction program data are supplied from outside the one-chip microcomputer.

10. A microcomputer system comprising:
a one-chip microcomputer including a program memory means for storing a program data, a program counter means for addressing said program memory means, and an instruction decoder means for decoding the program data read out from said program memory means addressed by said program counter means;
first electrically programmable memory means for storing a correction address data denoting an address of said program memory means where a program data to be corrected is stored, said first electrically programmable memory means being arranged on a different chip from said one-chip microcomputer;
comparison means for comparing an output from said program counter means with the correction address data stored in said first electrically programmable memory means, and for outputting a coincidence signal when a concidence is detected therebetween;
second electrically programmable memory means for storing a correction program data, and for outputting the correction program data in response to the coincidence signal, said second electrically programmable memory means being arranged on a different chip from said one-chip microcomputer; and selection means for receiving the output from said program memory means and an output from said second electrically programmable memory means, for, when the coincidence signal is output, supplying the output from said second electrically programmable memory means to said instruction decoder means, and for, when the coincidence signal is not output, supplying the output from said program memory means to said instruction decoder means;

said second electrically programmable memory means storing a first jump instruction to an unused address of said program memory means, a program data to be executed in response to the first jump instruction, and a second jump instruction to an address just after the address to be corrected, when a number of steps of the program data to be corrected in said program memory means is smaller than a number of steps of the correction program data, and said first electrically programmable memory means storing the unused address, an address subsequent to the unused address and corresponding to a number of steps of the correction program data, and an address corresponding to a third jump instruction.

11. A microcomputer according to claim 10, in which said first and second electrically programmable memory means comprise nonvolatile memory means.

12. A microcomputer according to claim 10, in which said first and second electrically programmable memory means comprise random access memories, and said correction address data and correction program data are supplied from outside the one-chip microcomputer.

13. A microcomputer comprising:
program memory means for storing a program data;
program counter means for addressing said program memory means;
instruction decoder means for decoding the program data read out from said program memory means and arranged outside of said microcomputer;
programmable nonvolatile memory means for storing address data denoting an address of said program memory means where a program data to be corrected is stored, and a correction program data;
comparison means for comparing the output from said program counter means with the address data stored in said nonvolatile memory means, and for outputting a coincidence signal when a coincidence is detected therebetween; and
output means for supplying the correction program data stored in said nonvolatile memory means to said instruction decoder means in response to the coincidence signal;
said output means comprising selector means for selecting one of the output from said program memory means and the output from said nonvolatile memory means in accordance with whether or not the coincidence signal is output, and for supplying the selected output to said instruction decoder means;
said comparison means includes means for outputting the coincidence signal, and means for supplying the program data in said nonvolatile memory means to said instruction decoder means; and
said selector means comprises means for detecting contents of the corrected program data from said nonvolatile memory means, means for selecting one of the output from said program memory means and the output from said nonvolatile memory means in accordance with the result of said detection of the contents of the corrected program data by said detecting means, and means for supplying the selected output to said instruction decoder means.

14. A microcomputer system comprising:
a one-chip microcomputer for controlling the microcomputer system based on a stored program, said one-chip microcomputer including on the one-chip thereof program memory means for storing a program data, program counter means for addressing said program memory means, and instruction decoder means for decoding the program data read out from said program memory means addressed by said program counter means; and
programmable nonvolatile memory means, arranged as a different chip from said one-chip microcomputer and being externally connected to said one-chip microcomputer, said programmable nonvolatile memory means having a first storage area for storing a pair of an address data denoting an address where a program data to be corrected is stored and a correction program data,
said one-chip microcomputer further comprising:
serial communication means for serially communicating said one-chip microcomputer with said external nonvolatile memory means to receive the address data and the correction program data from the first storage area of said nonvolatile memory means upon power-on of said microcomputer;
first memory means for storing the address data received from said external nonvolatile memory means via said serial communication means;
comparison means for comparing the output from said program counter means with the address data stored in said first memory means, and outputting a coincidence signal when a coincidence is detected therebetween;
second memory means for storing the correction program data received from said external nonvolatile memory means via said serial communication means, and outputting the correction program data in response to the coincidence signal; and
selection means for receiving the output from said program memory means and the output from said second memory means, for supplying the output from said second memory means to said instruction decoder means in response to the coincidence signal, and supplying the output from said program memory means to said instruction decoder means when the coincidence signal is not output.

15. A system according to claim 14, which further comprises means for executing an interruption processing in response to the coincidence signal to execute the correction program data stored in said nonvolatile memory means.

16. A system according to claim 15, in which said nonvolatile memory means further stores a data denoting a size of the correction program data.

17. A microcomputer system comprising
a one-chip microcomputer including a program memory means for storing a program data, a program counter means for addressing said program memory means, and an instruction decoder means for decoding the program data read out from said program memory means addressed by said program counter means;

first nonvolatile memory means, which is electrically programmable, having a first storage area for storing a pair of an address data denoting an address of said program memory means where a program data to be corrected is stored, the first nonvolatile memory means being arranged as a different chip external from said one-chip microcomputer;

comparison means for comparing an output from said program counter means with the address data stored in said first nonvolatile memory means, and for outputting a coincidence signal when a coincidence is detected therebetween;

second nonvolatile memory means, which is electrically programmable, for storing a correction program data, and for outputting the correction program data in response to the coincidence signal, the second nonvolatile arranged as a different chip external from said one-chip microcomputer; and selection means for receiving the output from said program memory means and an output from said second nonvolatile memory means, for, when the coincidence signal is output, supplying the output from said second nonvolatile memory means to said instruction decoder means, and for, when the coincidence signal is not output, supplying the output from said program memory means to said instruction decoder means, said selection means including inhibition means for inhibiting the program data stored in said second nonvolatile memory means from being supplied to said instruction decoder means even when the output of said program counter means coincides with data stored in said first nonvolatile memory means.

18. A system according to claim 17, which further comprises means for executing an interruption processing in response to the coincidence signal to execute the correction program data stored in said second nonvolatile memory means.

19. A system according to claim 18, in which said second nonvolatile memory means further stores a data denoting a size of the correction program data.

20. A microcomputer system comprising a one-chip microcomputer including a program memory means for storing a program data, a program counter means for addressing said program memory means, and an instruction decoder means for decoding the program data read out from said program memory means addressed by said program counter means;

first nonvolatile memory means, which is electrically programmable, having a first storage area for storing a pair of an address data denoting an address of said program memory means where a program data to be corrected is stored, and a second storage area for storing adjustment data for adjusting said microcomputer system, the first nonvolatile memory means being arranged as a different chip from said one-chip microcomputer;

comparison means for comparing an output from said program counter means with the address data stored in said first nonvolatile memory means, and for outputting a coincidence signal when a coincidence is detected therebetween;

second nonvolatile memory means, which is electrically programmable, for storing a correction program data, and for outputting the correction program data in response to the coincidence signal, the second nonvolatile arranged as a different chip from said one-chip microcomputer; and selection means for receiving the output from said program memory means and an output from said second nonvolatile memory means, for, when the coincidence signal is output, supplying the output from said second nonvolatile memory means to said instruction decoder means, and for, when the coincidence signal is not output, supplying the output from said program memory means to said instruction decoder means, said selection means including inhibition means for inhibiting the program data stored in said second nonvolatile memory means from being supplied to said instruction decoder means even when the output of said program counter means coincides with data stored in said first nonvolatile memory means.

21. A microcomputer system comprising:

a one-chip microcomputer for controlling the microcomputer system based on a stored program, said one-chip microcomputer including on the one-chip thereof program memory means for storing a program data, program counter means for addressing said program memory means, and instruction decoder means for decoding the program data read out from said program memory means addressed by said program counter means; and programmable nonvolatile memory means, said programmable nonvolatile memory means having a first storage area for storing a pair of an address data denoting an address where a program data to be corrected is stored and a correction program data, said one-chip microcomputer further comprising:

serial communication means for serially communicating said one-chip microcomputer with said external nonvolatile memory means to receive the address data and the correction program data from the first storage area of said nonvolatile memory means upon power-on of said microcomputer;

first memory means for storing the address data received from said external nonvolatile memory means via said serial communication means;

comparison means for comparing the output from said program counter means with the address data stored in said first memory means, and outputting a coincidence signal when a coincidence is detected therebetween;

second memory means for storing the correction program data received from said external nonvolatile memory means via said serial communication means, and outputting the correction program data in response to the coincidence signal; and selection means for receiving the output from said program memory means and the output from said second memory means, for supplying the output from said second memory means to said instruction decoder means in response to the coincidence signal, and supplying the output from said program memory means to said instruction decoder means when the coincidence signal is not output; and means for executing an interruption processing in response to the coincidence signal to execute the correction program data stored in said nonvolatile memory means.

22. A system according to claim 21, in which said nonvolatile memory means further stores a data denoting a size of the correction program data.

23. A system according to claim 21, which further comprises means for executing an interruption processing in response to the coincidence signal to execute the correction program data stored in said nonvolatile memory means.

24. A microcomputer system comprising a one-chip microcomputer including a program memory means for storing a program data, a program counter means for addressing said program memory means, and an instruction decoder means for decoding the program data read out from said program memory means addressed by said program counter means;

first nonvolatile memory means, which is electrically programmable, having a first storage area for storing a pair of an address data denoting an address of said program memory means where a program data to be corrected is stored;

comparison means for comparing an output from said program counter means with the address data stored in said first nonvolatile memory means, and for outputting a coincidence signal when a coincidence is detected therebetween;

second nonvolatile memory means, which is electrically programmable, for storing a correction program data, and for outputting the correction program data in response to the coincidence signal, the second nonvolatile arranged as a different chip external from said one-chip microcomputer; and selection mans for receiving the output from said program memory means and an output from said second nonvolatile memory means, for, when the coincidence signal is output, supplying the output from said second nonvolatile memory means to said instruction decoder means, and for, when the coincidence signal is not output, supplying the output from said program memory means to said instruction decoder means, said selection means including inhibition means for inhibiting the program data stored in said second nonvolatile memory means from being supplied to said instruction decoder means even when the output of said program counter means coincides with data stored in said first nonvolatile memory means; and means for executing an interruption processing in response to the coincidence signal to execute the correction program data stored in said nonvolatile memory means.

25. A system according to claim 24, in which said second nonvolatile memory means further stores a data denoting a size of the correction program data.

26. A system according to claim 24, which further comprises means for executing an interruption processing in response to the coincidence signal to execute the correction program data stored in said second nonvolatile memory means.

* * * * *